US012542267B2

(12) United States Patent
Wehrs et al.

(10) Patent No.: US 12,542,267 B2
(45) Date of Patent: Feb. 3, 2026

(54) DETERMINING AN EXPECTED RESPONSE OF A MASS SPECTROMETER

(71) Applicant: Thermo Fisher Scientific (Bremen) GmbH, Bremen (DE)

(72) Inventors: Henning Wehrs, Bremen (DE); Joachim Hinrichs, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 329 days.

(21) Appl. No.: 18/466,753

(22) Filed: Sep. 13, 2023

(65) Prior Publication Data
US 2024/0087872 A1      Mar. 14, 2024

(30) Foreign Application Priority Data

Sep. 14, 2022 (GB) ..................... 2213503

(51) Int. Cl.
*H01J 49/28* (2006.01)
(52) U.S. Cl.
CPC ................. *H01J 49/288* (2013.01)
(58) Field of Classification Search
USPC ...................................... 250/282
See application file for complete search history.

(56) References Cited

U.S. PATENT DOCUMENTS

| 8,481,926 B2 | 7/2013 | Loboda |
| 2011/0057095 A1 | 3/2011 | Loboda |
| 2014/0361158 A1 | 12/2014 | Remes et al. |

| 2020/0176238 A1* | 6/2020 | Pfaff ............... H01J 49/0004 |
| 2021/0013017 A1* | 1/2021 | Schwieters ...... G01N 27/44717 |
| 2021/0225627 A1* | 7/2021 | Xuan ............... H01J 49/0036 |

FOREIGN PATENT DOCUMENTS

| EP | 3769334 B1 | 3/2022 |
| EP | 4339999 A1 | 3/2024 |

OTHER PUBLICATIONS

Examination Report for related GB Application No. 2213503.2, 4 pages, dated Sep. 27, 2024.
Combined Search and Examination Report under Sections 17 and 18(3) for related UK Application No. GB2213503.2, issued by the UK Intellectual Property Office on Mar. 29, 2023, 5 pages.
Extended European Search Report from European Application No. 23197463.5, dated Feb. 1, 2024, 8 pp.

* cited by examiner

*Primary Examiner* — Kiet T Nguyen
(74) *Attorney, Agent, or Firm* — Klarquist Sparkman, LLP

(57) ABSTRACT

A method of determining an expected response to injecting a beam of ions of a species of interest into a static field mass filter of a mass spectrometer including a mass analyser is provided. The method includes: measuring an intensity of ions injected into the static field mass filter for various combinations of test ion species, test magnetic field strengths, and test electric field strengths; determining electric field strengths corresponding to an intensity equal to a first and a second fraction of the measured peak intensity; based on a predetermined relationship between magnetic field strength, electric field strength and centre mass of the static field mass filter, determining mass values corresponding to the determined electric field strengths; and interpolating, from said mass values and for each ion species and for at least one of the test magnetic field strengths, expected mass values for an ion species of interest.

20 Claims, 15 Drawing Sheets

FIG. 7B

| EP-V 200ppb Tune | Mass | % B field | E-field high mass 20% | E-field high 80% | E-field low 80% | E-field low 20% | Centre high mass 20% | Centre high 80% | Centre low 80% | Centre low 20% |
|---|---|---|---|---|---|---|---|---|---|---|
| C | 12 | 20 |  |  |  |  | 0,0 | 0,0 | 0,0 | 0,0 |
| Mg | 12 | 20 | 292 | 301,5 | 330 | 338 | 13,3 | 12,5 | 10,4 | 9,9 |
| Sc | 88 | 20 | 198 | 204 | 240 | 248 | 29,0 | 27,3 | 19,7 | 18,5 |
| Co | 142 | 20 | 132,5 | 137,5 | 148,5 | 188 | 64,7 | 60,1 | 51,5 | 32,1 |
| Sr | 178 | 20 | 113 | 121 | 146,5 | 167,5 | 89,0 | 77,6 | 52,9 | 40,5 |
| Nd | 238 | 20 | 89,5 | 100,5 | 128,5 | 138,5 | 141,9 | 112,5 | 68,8 | 59,2 |
| Hf | 88 | 20 | 65 | 76 | 104 | 115,5 | 268,9 | 196,7 | 105,1 | 85,2 |
| Pb | 142 | 20 | 55 | 66,5 | 93,5 | 106 | 375,6 | 256,9 | 130,0 | 101,1 |
| U | 178 | 20 | 49 | 60 | 88 | 99,5 | 473,3 | 315,6 | 146,7 | 114,8 |
|  | 238 | 20 | 44 | 55,5 | 82,5 | 95 | 586,9 | 368,9 | 166,9 | 125,9 |
| Co | 88 | 50 |  |  |  |  | 0,0 | 0,0 | 0,0 | 0,0 |
| Sr | 88 | 50 | 302,5 | 317,5 | 349 | 356,5 | 71,1 | 64,6 | 53,4 | 51,2 |
| Nd | 88 | 50 | 243,5 | 254 | 288 | 298 | 109,8 | 100,9 | 78,5 | 73,3 |
| Hf | 88 | 50 | 186 | 197 | 229 | 240 | 188,2 | 167,7 | 124,1 | 113,0 |
| Pb | 142 | 50 | 163,5 | 176 | 205 | 217 | 243,5 | 210,2 | 154,9 | 138,2 |
| U | 178 | 50 | 149,5 | 162 | 191 | 202,5 | 291,3 | 248,0 | 180,0 | 158,8 |
|  | 238 | 50 | 138 | 151,5 | 177,5 | 191 | 341,8 | 283,6 | 206,6 | 178,4 |
| Nd | 88 | 50 |  |  |  |  | 0,0 | 0,0 | 0,0 | 0,0 |
| Hf | 88 | 50 | 276,5 | 288,5 | 322 | 334 | 171,2 | 157,3 | 126,3 | 117,3 |
| Pb | 142 | 50 | 243,5 | 257 | 289,5 | 301,5 | 220,8 | 198,2 | 156,2 | 144,0 |
| U | 178 | 50 | 224 | 238 | 268 | 280,5 | 260,9 | 231,1 | 182,3 | 166,4 |
|  | 238 | 50 | 207,5 | 221 | 250 | 264,5 | 304,0 | 268,0 | 209,5 | 187,1 |
| Nd | 142 | 100 |  |  |  |  | 0,0 | 0,0 | 0,0 | 0,0 |
| Hf | 142 | 100 | 301 | 312,5 | 345,5 | 357 | 171,3 | 158,9 | 130,0 | 121,8 |
| Pb | 178 | 100 | 266 | 280 | 308 | 322,5 | 219,4 | 198,0 | 160,0 | 149,2 |
| U | 208 | 100 | 244,5 | 257 | 288 | 301 | 259,6 | 235,0 | 187,1 | 171,3 |
|  | 238 | 100 | 227 | 240,5 | 269 | 283,5 | 301,2 | 268,3 | 214,5 | 193,1 |

701 — Nd, Hf, Pb, U
702 — % B field
703 — E-field low 80%
704 — E-field high 80%
705 — Centre low 80%
706 — Centre high 80%
711 — E-field low 20%
712 — E-field high mass 20%
713 — Centre low 20%
714 — Centre high mass 20%

DETERMINING AN EXPECTED RESPONSE OF A MASS SPECTROMETER

CROSS-REFERENCE TO RELATED APPLICATION

The present application claims priority to United Kingdom Patent Application No. GB2213503.2, filed on Sep. 14, 2022, the complete disclosure of which is incorporated herein by reference in its entirety.

FIELD

The present disclosure relates generally to mass spectrometers with a static field mass filter.

BACKGROUND

Multicollector mass spectrometers, such as inductively coupled plasma mass spectrometers (MC-ICP-MS), are instruments used to investigate small differences in the abundance ratios of analysed isotopes.

For example, Strontium (Sr) has 4 isotopes with the following masses and abundances:

| Isotope   | 84Sr  | 86Sr  | 87Sr | 88Sr   |
|-----------|-------|-------|------|--------|
| Abundance | 0.56% | 9.86% | 7%   | 82.58% |

With improvements in the accuracy of mass spectrometers during the last century, it became clear that the isotope ratios (87Sr/86Sr≈0.7103 or 84Sr/87Sr≈0.0535) are not identical across different samples. Furthermore, it became apparent that the accurate determination of Sr isotope ratios is a powerful tool for archaeologists. Since the isotopic composition of the diet of an individual is preserved in the bones of an individual, a statement about the place of birth of an individual can be made when matching the Sr isotope ratios of the bones of a dead body to the Sr isotope ratios of the soil in a specific region.

Besides Sr, there are many other isotope systems which are of interest for scientific or technical questions. Another example is the Rubidium-Strontium (Rb—Sr) dating which makes use of the fact that 87Rb decays into 87Sr with a half-life of about 50 billion years: by determining the 87Sr/86Sr ratio as well as the Rb/Sr ratio of different minerals of a sample, the time elapsed since the sample crystallised can be calculated.

However, the 87Sr cannot be easily mass resolved from the 87Rb (86.909180527 amu to 86.9088774970 amu would require a mass resolving power of more than 200,000, while the upper limit of commercially available isotope ratio mass spectrometers is below 50,000). Isotopic methods that suffer from isotopic interferences as the Rb/Sr method therefore require complex chemical cleaning steps prior to the actual measurement with a mass spectrometer, which makes these methods time consuming and limits them to samples that are available in relatively high quantities.

A solution for this problem is the use of a collision reaction cell: the ions are guided through a cell which is filled with a reactive gas. With an appropriate choice of the gas, one can obtain that the analyte ions are mass-shifted (by forming molecules when reacting with the gas), while the interfering ions are not. For example, the analyte ions become 16 atomic mass units (amu) heavier when reacting with oxygen, while the mass of the interfering ions remains the same.

By doing this, the mass difference of sample ions and interfering ions, which was marginal before entering the collision cell, becomes large enough to be easily resolved by the mass spectrometer downstream of the collision cell.

To avoid the problem of elements that interfere with the mass shifted analyte ions, a pre-mass-filter with a bandpass characteristic can be used, such that only the masses of interest reach the collision cell while ions that interfere with the mass shifted ions are not transmitted. In EP 3 769 334 B1, the entire contents of which are herewith incorporated by reference in this document, a pre-filter comprising a combination of two Wien filters is disclosed. Such a pre-filter can have a mass-independent transmission.

A pre-filter comprising a combination of two Wien filters is suitable for blocking the intense Ar beam caused by the plasma source of ICP-MS instruments as early as possible in the ion optics. By blocking the Ar beam, the total ion load of the ion beam is greatly reduced. This is beneficial for the resolving power of the instrument and, in particular, for the abundance sensitivity. However, optimising the settings of a pre-filter comprising a double Wien filter is not intuitive.

SUMMARY

Aspects of the present disclosure are defined in the accompanying independent claims.

Overview of Disclosure

A method of determining, for a target ion mass, a bandpass range of an ion filter for a mass spectrometer is disclosed herein. The method comprises:
  introducing at least two ion species into the ion filter;
  scanning a mass range of each ion species by changing at least one filter parameter;
  determining an ion intensity associated with each scanned mass using the mass spectrometer;
  registering the ion intensities and the associated filter parameters of each scanned mass range;
  for each scanned mass range, determining a maximum ion intensity and the associated centre mass;
  for each scanned mass range, determining: a first mass associated with a first ion intensity corresponding with a first fraction of the respective maximum intensity, and a second mass associated with a second ion intensity corresponding with a second fraction of the respective maximum intensity, wherein the first mass is lower than the centre mass of the ion species and the second mass is higher than the centre mass of the ion species; and
  for the target ion mass having a known centre mass, deriving the masses having the associated first ion intensity and second ion intensity from the determined first ion intensities and second ion intensities of the scanned masses.
Optionally, the deriving comprises:
interpolating, from the first mass, a first expected mass having the associated first ion intensity using a first interpolant function; and
interpolating, from the second mass, a second expected mass having the associated second ion intensity using a second interpolant function.
Optionally, the method further comprises:
determining a first difference between the first expected mass and the second expected mass; and based on the first difference, determining a passband width of a bandpass characteristic of the static field mass filter for the target ion species.

Optionally, the method further comprises:
determining a first difference between the first expected mass and the second expected mass; and
based on the first difference, determining a passband width of a bandpass characteristic of the ion filter for the target ion species.

Optionally, the method further comprises, for each scanned mass range, determining a third mass associated with a third ion intensity corresponding with a third fraction of the respective maximum intensity, and a fourth mass associated with a fourth ion intensity corresponding with a fourth fraction of the respective maximum intensity, wherein the third mass is lower than the centre mass of the ion species and the fourth mass is higher than the centre mass of the ion species; and
for the target ion mass having a known centre mass, deriving the masses having the associated third ion intensity and fourth ion intensity from the determined third ion intensities and fourth ion intensities of the scanned masses.

Optionally, the deriving comprises:
interpolating, from the third mass, a third expected mass having the associated third ion intensity using a third interpolant function; and
interpolating, from the fourth mass, a fourth expected mass having the associated fourth ion intensity using a fourth interpolant function.

Optionally, the method further comprises:
determining a second difference between the first expected mass and the third expected mass; and
based on the second difference, determining a lower flank width of the bandpass characteristic of the static field mass filter for the target ion species.

Optionally, the method further comprises:
determining a second difference between the first expected mass and the third expected mass; and
based on the second difference, determining a lower flank width of the bandpass characteristic of the ion filter for the target ion species.

Optionally, the method further comprises:
determining a third difference between the second expected mass and the fourth expected mass; and
based on the third difference, determining an upper flank width of the bandpass characteristic of the static field mass filter for the target ion species.

Optionally, the method further comprises:
determining a third difference between the second expected mass and the fourth expected mass; and
based on the third difference, determining an upper flank width of the bandpass characteristic of the ion filter for the target ion species.

Optionally, the masses of the at least two ion species are evenly distributed over a mass range of interest.

Optionally, the method further comprises displaying one or more of the interpolated masses and, optionally, one or more of the determined masses.

Optionally, the method further comprises displaying the transmission windows of the interpolated expected masses.

A method of determining an expected response to injecting a beam of ions of a species of interest into a static field mass filter of a mass spectrometer comprising a mass analyser is disclosed herein. The method comprises:

for each species of a plurality of test ion species:
causing a beam of ions of the species to be injected into the static field mass filter; and
for each of a plurality of test magnetic field strengths of the static field mass filter;
setting the magnetic field to the test magnetic field strength;
for each of a plurality of test electric field strengths of the static field mass filter:
setting the electric field to the test electric field strength; and
measuring, using the mass analyser, an intensity of ions of the species in the beam for the test magnetic field strength and the test electric field strength;
determining a first electric field strength of the plurality of test electric field strengths at which the measured intensity has reached a peak intensity;
determining a second electric field strength of the plurality of test electric field strengths at which the measured intensity has reached a first predetermined fraction of the peak intensity, the second electric field strength being higher than the first electric field strength;
determining a third electric field strength of the plurality of test electric field strengths at which the measured intensity has reached a second predetermined fraction of the peak intensity, the third electric field strength being lower than the first electric field strength; and
based on a first predetermined relationship between magnetic field strength, electric field strength and centre mass of the static field mass filter, determining a first lower mass corresponding to the second electric field strength and the test magnetic field strength and determining a first higher mass corresponding to the third electric field strength and the test magnetic field strength;
interpolating, from the first lower mass for each of the plurality of test ion species and for at least one of the test magnetic field strengths, a first lower expected mass for an ion species of interest using a first interpolant function; and
interpolating, from the first higher mass for each of the plurality of test ion species and for the at least one of the test magnetic field strengths, a first higher expected mass for the ion species of interest using a second interpolant function.

Optionally, at least one of the first and second interpolant functions is a polynomial function.

Optionally, the method further comprises:
interpolating, from the first lower mass for each of the plurality of test magnetic field strengths and for at least one of the test ion species, a second lower expected mass for at least one magnetic field strength of interest using a third interpolant function; and
interpolating, from the first higher mass for each of the plurality of test magnetic field strengths and for the at least one of the test ion species, a second higher expected mass for the at least one magnetic field strength of interest using a fourth interpolant function, further optionally wherein at least one of the third and fourth interpolant functions is a polynomial function.

Optionally, the method further comprises:
determining a first difference between the first lower expected mass and the first higher expected mass; and based on the first difference, determining a passband width of a bandpass characteristic of the static field mass filter for the ion species of interest.

Optionally, the method further comprises, for each species of the plurality of test ion species and for each of the plurality of test magnetic field strengths:

determining a fourth electric field strength of the plurality of test electric field strengths at which the measured intensity has reached a third predetermined fraction of the peak intensity, the fourth electric field strength being higher than the first electric field strength; and determining a fifth electric field strength of the plurality of test electric field strengths at which the measured intensity has reached a fourth predetermined fraction of the peak intensity, the fifth electric field strength being lower than the first electric field strength.

Optionally, the method further comprises, for each species of the plurality of test ion species and for each of the plurality of test magnetic field strengths:

based on the first predetermined relationship between magnetic field strength, electric field strength and centre mass of the static field mass filter, determining a second lower mass corresponding to the fourth electric field strength and the test magnetic field strength and determining a second higher mass corresponding to the fifth electric field strength and the test magnetic field strength.

Optionally, the method further comprises:

interpolating, from the second lower mass for each of the plurality of test ion species and for at least one of the test magnetic field strengths, a third lower expected mass for the ion species of interest using a fifth interpolant function; and interpolating, from the second higher mass for each of the plurality of test ion species and for the at least one of the test magnetic field strengths, a third higher expected mass for the ion species of interest using a sixth interpolant function.

Optionally, the method further comprises:

determining a second difference between the first lower expected mass and the third lower expected mass; and based on the second difference, determining a lower flank width of the bandpass characteristic of the static field mass filter for the ion species of interest.

Optionally, the method further comprises:

determining a third difference between the first higher expected mass and the third higher expected mass; and based on the third difference, determining an upper flank width of the bandpass characteristic of the static field mass filter for the ion species of interest.

Optionally, the static field mass filter comprises a first Wien filter and a second Wien filter.

Optionally, each species of the plurality of test ion species has a mass and wherein the masses of the plurality of test ion species are evenly distributed over a mass range of interest.

Optionally, the method further comprises:

displaying one or more of the interpolated lower and higher expected masses and, optionally, one or more of the determined lower and higher masses, and further optionally, the method comprises displaying the transmission windows of the interpolated lower and higher expected masses.

Optionally, the method is computer-implemented.

There is disclosed an apparatus configured to perform any of the methods described herein.

There is disclosed a computer-readable medium comprising instructions which, when executed by a processor of an apparatus, cause the apparatus to perform any of the methods described herein.

BRIEF DESCRIPTION OF THE DRAWINGS

Examples of the present disclosure will now be explained with reference to the accompanying drawings in which:

FIG. 7B is a table showing another example of data obtained by performing the method of FIGS. 6A and 6B, in accordance with various implementations.

Throughout the description and the drawings, like reference numerals refer to like parts. Implementations are illustrated by way of example, not by way of limitation, in the figures of the accompanying drawings.

DETAILED DESCRIPTION

Figure 1:
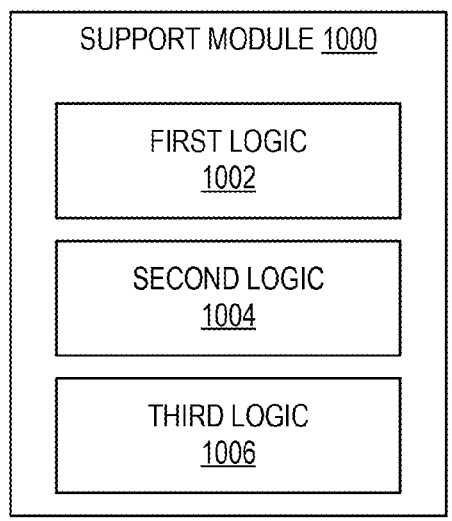
FIG. 1 is a block diagram of an example scientific instrument support module for performing support operations, in accordance with various implementations.

In overview, a method of determining an expected response to injecting a beam of ions of at least one species of interest into a static field mass filter of a mass spectrometer comprising a mass analyser is disclosed herein.

The method comprises: measuring an intensity of ions injected into the static field mass filter for various combinations of test ion species, test magnetic field strengths, and test electric field strengths; determining electric field strengths corresponding to an intensity equal to a first and a second fraction of the measured peak intensity; based on a predetermined relationship between magnetic field strength, electric field strength and centre mass of the static field mass filter, determining mass values corresponding to the determined electric field strengths; and interpolating, from said mass values and for each ion species and for at least one of the test magnetic field strengths, expected mass values for an ion species of interest.

The present approach is for use in a mass spectrometer including a static field mass filter such as (but not limited to) that described in EP 3 769 334 B1 (e.g., Thermo Fisher Scientific's "Neoma™ MS/MS MC-ICP-MS"). Static field mass filters may apply a constant electric field and apply a magnetic field. This leads to a flat transmission of ions across a selected mass-to-charge ratio (m/z) range, and small deviations in system tuning should not change the measured isotope ratio in an unpredictable way. The static field mass filter is able to select a mass window prior to entry of the ions into a reaction cell. Although masses are separated by static magnetic and electric fields, the complete arrangement of the ion optical pre-filter setup does not introduce a lateral mass discrimination for the selected m/z window at the relatively small input aperture of a reaction cell.

Preferably, the static field mass filter comprises a first and a second Wien filter with an inversion lens between them. This arrangement uses static and not time-dependent (RF-based) ion optics to separate the ions and, as a result of the symmetry between the first and second Wien filters and the use of an inversion lens, mass-to-charge separation introduced within the static field mass filter is nullified at the exit thereof. The resulting instrument may be tuned along the path of the ions, because there is a relatively simple relationship between the electric and magnetic fields, and the mass-to-charge ratio of the ions.

The design of a double Wien-filter preceding the standard Neoma™ mass spectrometer in the Neoma™ MS/MS MC-ICP-MS provides a pre-filter which allows unwanted ion beams, such as Argon (Ar), to be cut from the mass spectrum or to clean a mass range for reacting analytes into this mass area for online chemical separation via a collision cell. Tuning this part of the instrument is important for good performance.

In the case of Neoma™ MS/MS a combination of two Wien filters has been chosen for pre-filtering the ions. This is because, to avoid the problem of elements that interfere with the mass shifted analyte ions, a pre-mass-filter with a bandpass characteristic should be used such that only the masses of interest reach the collision cell while ions that interfere with the mass shifted ions are not transmitted. The benefit of using two Wien filters is that it does not require alternating potentials (as in a quadrupole filter) which usually lead to a mass dependent transmission.

Another important function of the pre-filter is to block the intense Ar beam that is apparent in mass spectrometers with a plasma source as early as possible in the ion optics. By blocking the Ar beam the total ion load of the ion beam is greatly reduced, which is beneficial for the resolving power of the instrument and most of all beneficial for the abundance sensitivity.

Optimising the settings of the double Wien filter that is used in the Neoma™ MS/MS for best analytical conditions specific for each isotope system to be analysed is not intuitive for the operator since the parameters that control the transmission behaviour of the pre-filter have overlapping effects on the width of the bandpass, the steepness of its flanks and on the centre mass. A second reason why the tuning is not intuitive is that the flanks of the transmission curve are relatively wide and not symmetrical.

To predict the transmission of the double Wien filter a calibration is useful. Having a set procedure to perform the calibration prevents a trial and error experience for the user when trying to obtain a bandpass characteristic of the pre-filter for tuning the MS/MS Wien pre-filter settings.

It is noted that the present disclosure is not limited to mass spectrometers having an ICP ion source but can also be applied to mass spectrometers having an electron ionization ion source, a chemical ionization ion source, an electrospray ion source, a matrix-assisted laser desorption/ionization (MALDI) ion source, a photoionization ion source, a glow discharge ionization sources, a thermal ionization source and/or any other suitable ionization source.

The approaches described herein may be implemented using the apparatus or system(s) described below.

FIG. 1 is a block diagram of a scientific instrument support module 1000 for performing support operations, in accordance with various implementations. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 4000 of FIG. 4. Examples of systems of interconnected computing devices, in which the scientific instrument support module 1000 may be implemented across one or more of the computing devices, are discussed herein with reference to the scientific instrument support system 5000 of FIG. 5.

The scientific instrument support module 1000 may include first logic 1002, second logic 1004, and third logic 1006. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular implementation, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

As mentioned above, the scientific instrument support module 1000 may be implemented in a system of interconnected computing devices. In such a system, the scientific instrument support module 1000 may interact with a scientific instrument 5010 (the interaction with which is discussed herein with reference to FIG. 5) which may include any appropriate scientific instrument, such as a mass spectrometer 200 having a static field mass filter 204.

Figure 2A:
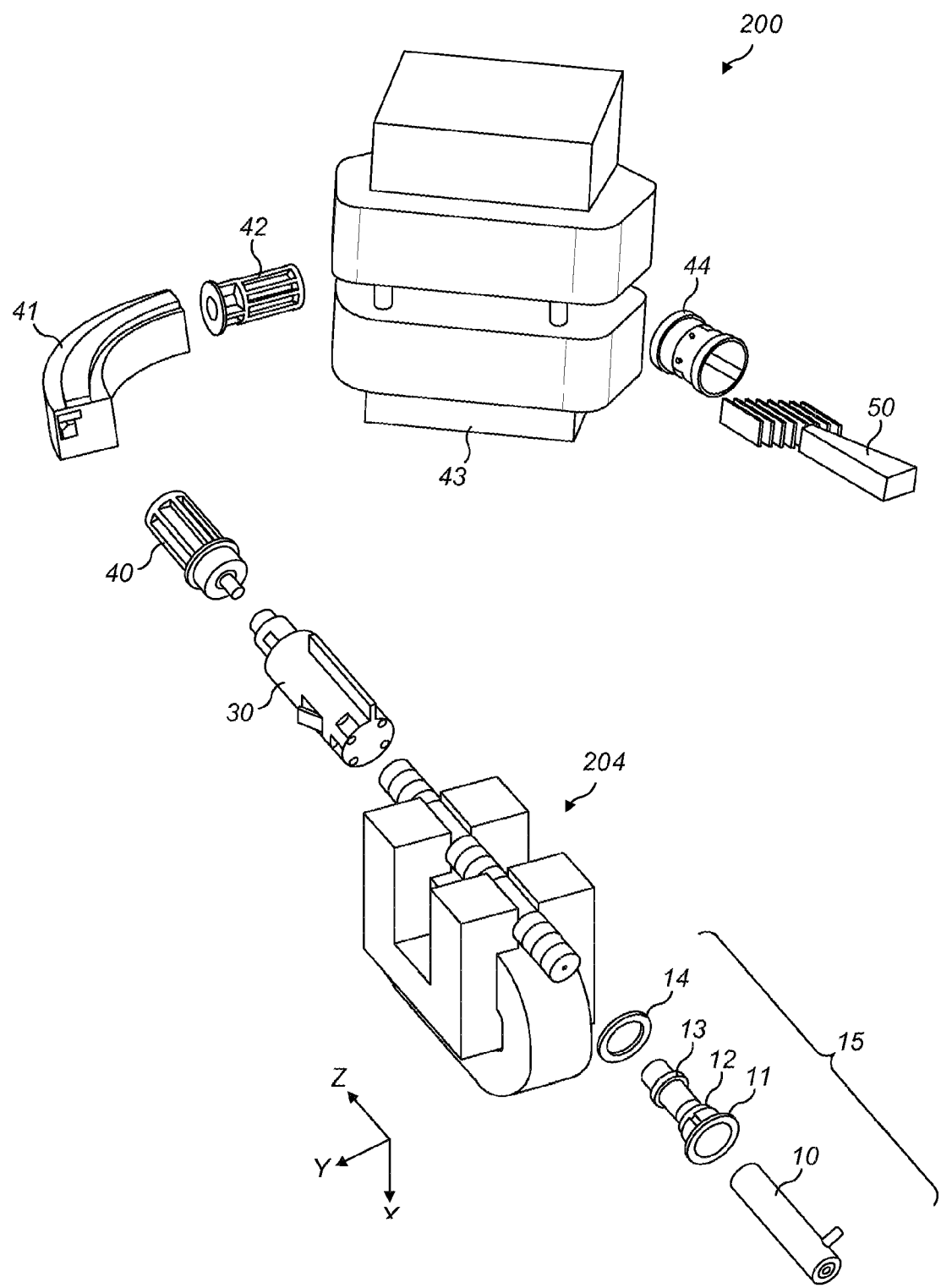
FIG. 2A is a simplified view of an example instrument system in accordance with various implementations.

FIG. 2A shows a view of an example mass spectrometer 200 having a static field mass filter 204.

The mass spectrometer 200 includes an ion source 15. The ion source 15 includes a triaxial ICP torch 10, a sampler cone 11, one or more skimmer cones 12, an extraction lens 13 and/or a further skimmer cone 14 and/or another ion optical device 14. This results in a collimated ion beam.

Downstream of the ion source 15, instead of a quadrupole (RF) mass filter, is positioned a static field mass filter 204 which will be described in further detail below. The static field mass filter 204 maintains constant electric and magnetic fields, so that transmission of ions through the static field mass filter has a flat response across the selected m/z range. A quadrupole mass filter does not provide such a flat response. This is because the ions are only influenced by static fields. In a quadrupole mass filter, the electromagnetic fields change with time according to the applied frequency. This results in a zig zag trajectory of the ions which are pushed back and forth. Moreover, small deviations in system tuning of the static field mass filter 204 do not change the measured isotope ratio in an unpredictable way. Nevertheless, the static field mass filter 204 does not introduce a lateral mass discrimination (as would happen in, for example, a magnetic sector analyser) so that the ion beam exiting the static field mass filter 204 can be focussed onto the relatively small (c. 2 mm) entrance aperture of a collision cell 219, across the width of the mass window selected for transmission by the static field mass filter 204.

Following the collision cell 219, ions are accelerated by an accelerator 40 and focussed into the ion optics of a double focusing high resolution multicollector mass spectrometer for simultaneous detection of different isotopes (of the sample or standards). Further, the double focusing high resolution multicollector mass spectrometer again includes an electrostatic sector 41 and a magnetostatic sector 43, separated by a focussing lens 42. Downstream of the high resolution multicollector mass spectrometer, the arrangement contains dispersion optics 44 and finally a detector platform 50 again, for example, such as that described in GB-A-2,541,391.

The preferred arrangement of a static field mass filter 204 in the arrangement of FIG. 2A is a double Wien filter. Wien filters employ an arrangement of crossed electrostatic and magnetostatic fields. Ions passing through this arrangement are subject to the magnetic Lorentz force and the electric field strength.

Figure 2B:
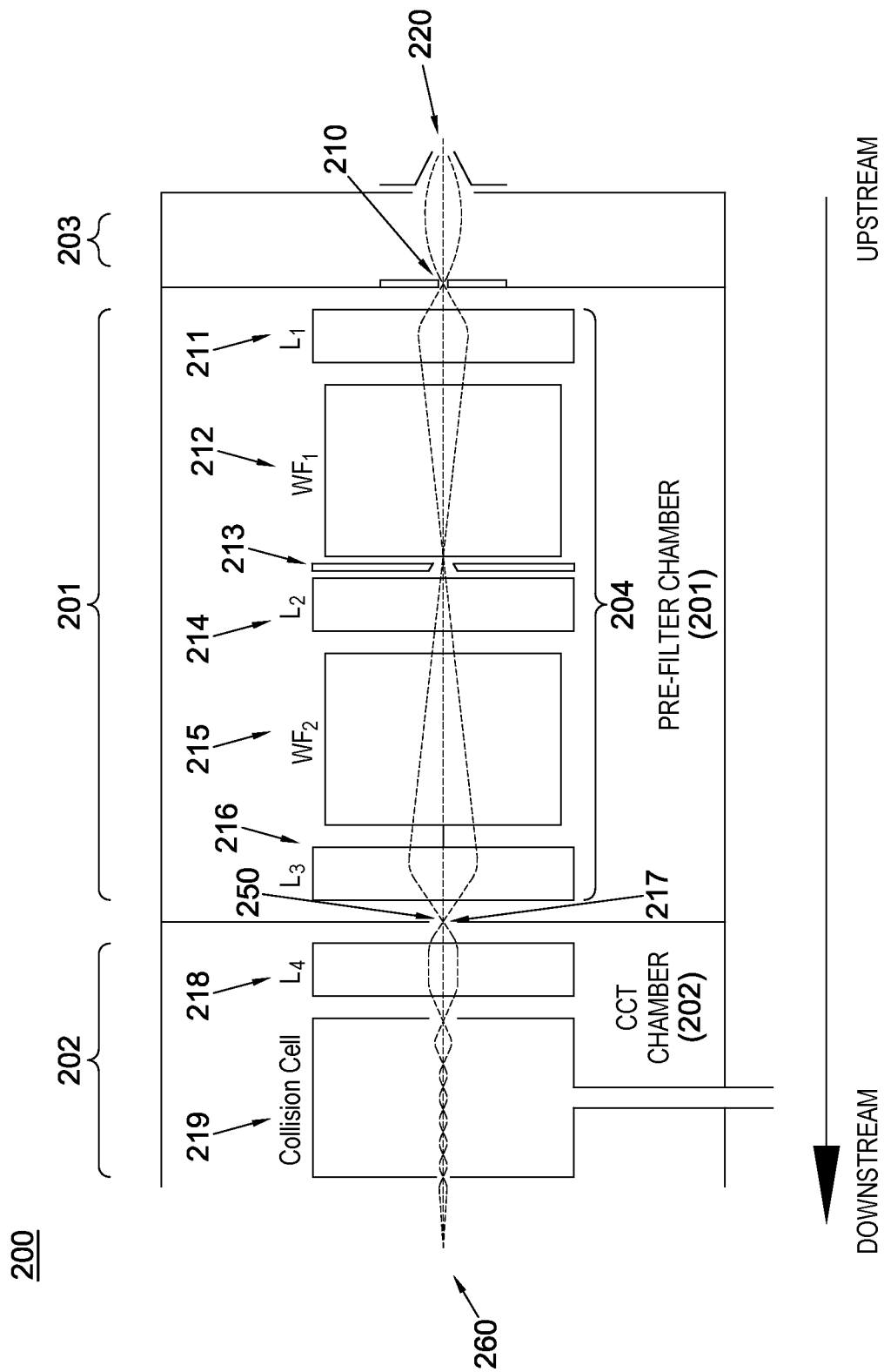
FIG. 2B is a simplified diagram of an example static field mass filter of the instrument system in accordance with various implementations.

FIG. 2B is simplified diagram of a pre-filter chamber 201 of a mass spectrometer 200 having a static field mass filter 204 in which some or all of the methods disclosed herein may be performed, in accordance with various implementations.

The mass spectrometer also has a collision cell chamber 202 and an extraction area 203, respectively downstream and upstream of the pre-filter chamber 201.

The mass spectrometer 200 may also include a mass analyser (not shown) downstream of the collision cell chamber 202 shown in FIG. 2B.

The pre-filter chamber 201 of the mass spectrometer 200 may comprise an entrance aperture 210, a static field mass filter 204, and an exit aperture 217. The static field mass filter 204 may comprise a first lens (or 'lens one') 211, a first Wien filter 212, a slit 213 (which can be narrowed to a minimum slit width and widened to a width larger than the minimum slit width), a second lens (or 'lens two') 214, a second Wien filter 215, and a third lens (or 'lens three') 216.

The collision cell chamber 202 may comprise a fourth lens (or 'lens four') 218 and a collision cell 219.

The extraction area 203 may comprise an extraction lens (not shown) for injecting a beam of ions 220 comprising one or more ion species into the pre-filter chamber 201 through entrance aperture 210.

The beam 220 may pass through the pre-filter chamber 201 and exit from exit aperture 217 to yield beam 250. The beam 250 exiting the pre-filter chamber 201 may enter the collision cell chamber 202. In the collision cell chamber 202, exiting beam 250 may pass through fourth lens 218 and collision cell 219 to yield beam 260.

Figure 4:
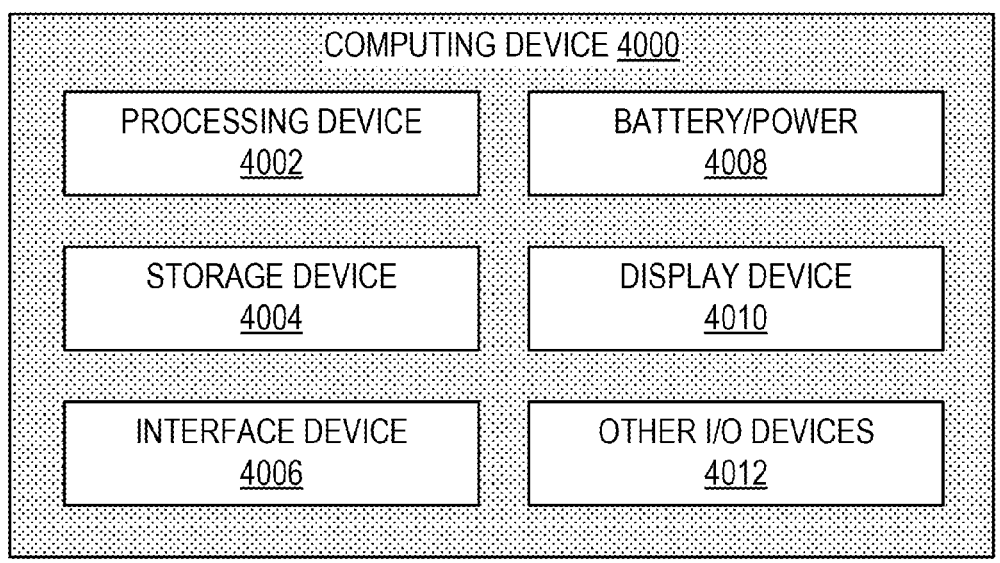
FIG. 4 is a block diagram of an example computing device that may perform some or all of the methods disclosed herein, in accordance with various implementations.
Figure 5:
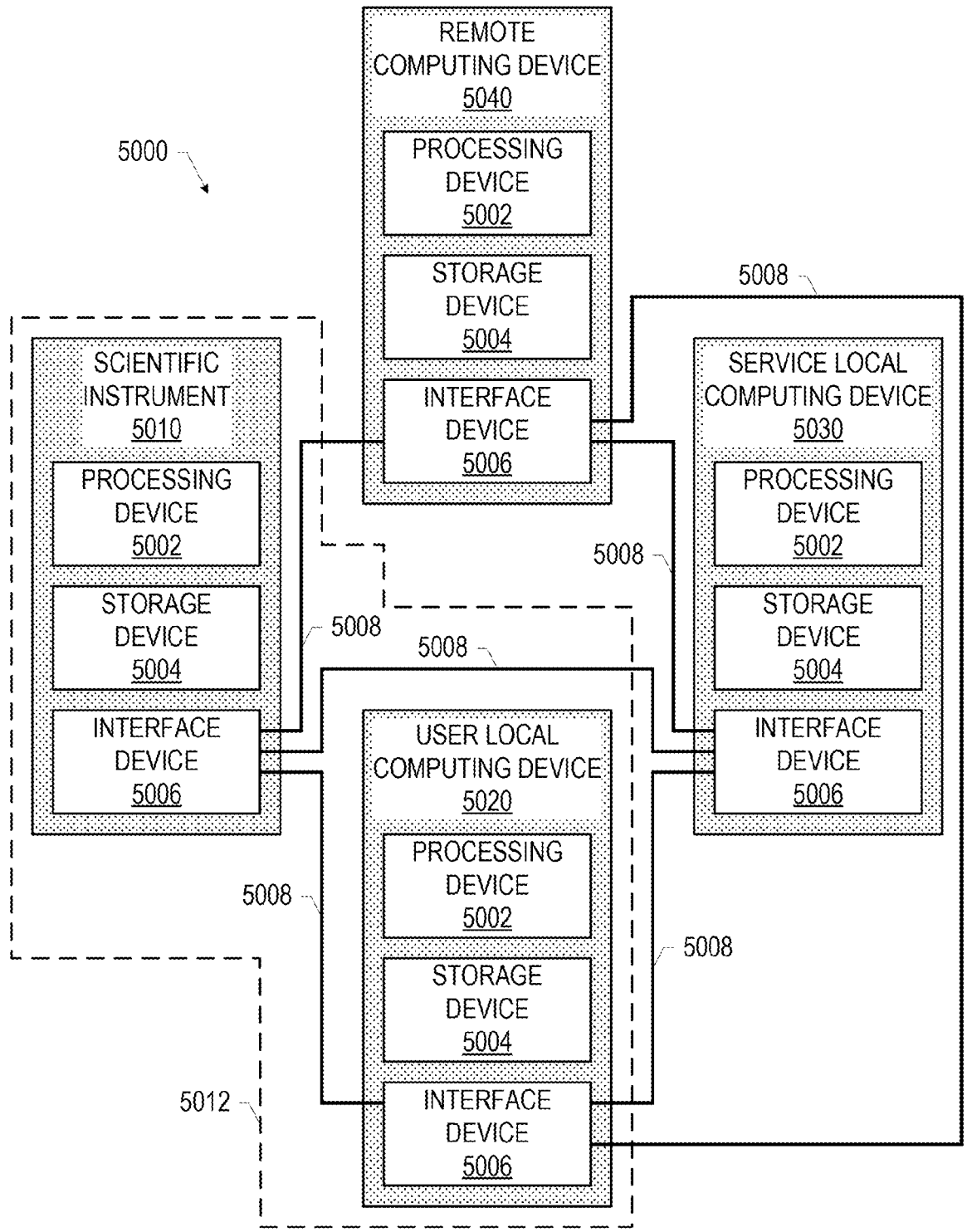
FIG. 5 is a block diagram of an example scientific instrument support system in which some or all of the methods disclosed herein may be performed, in accordance with various implementations.

The methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analysed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some implementations, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The scientific instrument support systems disclosed herein may include any suitable GUIs for interaction with a user.

Figure 3:
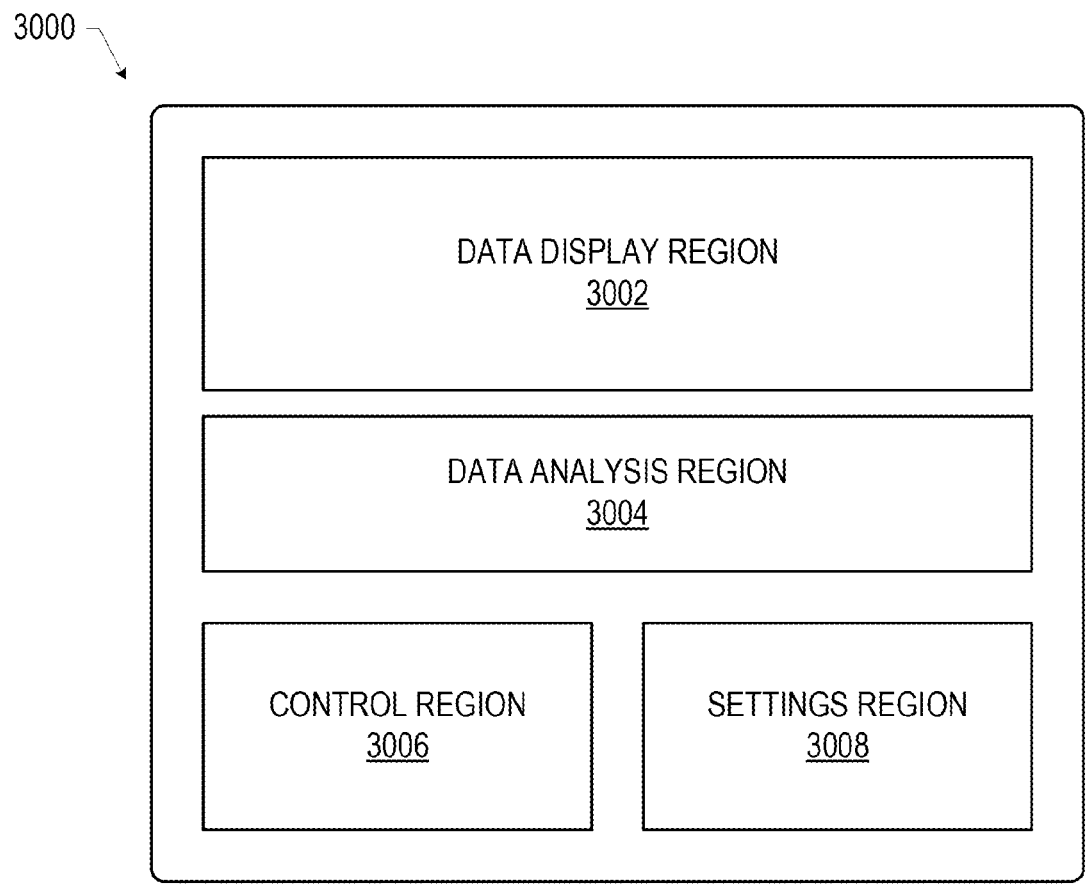
FIG. 3 is an example of a graphical user interface that may be used in the performance of some or all of the methods disclosed herein, in accordance with various implementations.

FIG. 3 depicts an example GUI 3000 that may be used in the performance of some or all of the methods disclosed herein, in accordance with various implementations. As noted above, the GUI 3000 may be provided on a display device (e.g., the display device 4010 discussed herein with reference to FIG. 4) of a computing device (e.g., the computing device 4000 discussed herein with reference to FIG. 4) of a scientific instrument support system (e.g., the scientific instrument support system 5000 discussed herein with reference to FIG. 5), and a user may interact with the GUI 3000 using any suitable input device (e.g., any of the input devices included in the other I/O devices 4012 discussed herein with reference to FIG. 4) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 3 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 5). For example, the data display region 3002 may display any intensities, magnetic and/or electric field strengths, test species, and interpolant functions according to the methods disclosed herein.

The data analysis region 3004 may display the results of data analysis (e.g., the results of analysing the data illustrated in the data display region 3002 and/or other data). For example, the data analysis region 3004 may display determined masses, expected masses and/or any other result of an interpolation (e.g., a plot), as determined in the approaches described herein. In some implementations, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 5). For example, the scientific instrument control region 3006 may include controls to cause a beam of ions to be injected into the static field mass filter 204 or to measure an intensity of ions of the species in a beam.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 4, sending data to another user, labelling data, etc.). For example, the settings region 3008 may include settings to switch between automated and manual analysis modes of the mass spectrometer 200.

As noted above, the scientific instrument support module 1000 may be implemented by one or more computing devices. FIG. 4 is a block diagram of a computing device 4000 that may perform some or all of the methods disclosed herein, in accordance with various implementations. In some implementations, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some implementations, some or all of the components included in the computing device 4000 may be attached to one or more motherboards and enclosed in a housing (e.g., including plastic, metal, and/or other materials). In some implementations, some these components may be fabricated onto a single system-on-a-chip (SoC) (e.g., an SoC may include one or more processing devices 4002 and one or more storage devices 4004). Additionally, in various implementations, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some implementations, the storage device 4004 may include memory that shares a die with a processing device 4002. In such an implementation, the memory may be used as cache memory and may include embedded dynamic random access memory (eDRAM) or spin transfer torque magnetic random access memory (STT-MRAM), for example. In some implementations, the storage device 4004 may include computer readable media having instructions thereon that, when executed by one or more processing devices (e.g., the processing device 4002), cause the computing device 4000 to perform any appropriate ones of or portions of the methods disclosed herein. The computer-readable media may be transitory (e.g., a wire or a wireless propagation medium in which a signal is being transmitted) or non-transitory.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some implementations they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). In some implementations, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some implementations, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some implementations, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some implementations, the interface device 4006 may include one or more antennas (e.g., one or more antenna arrays) for receipt and/or transmission of wireless communications.

In some implementations, the interface device 4006 may include circuitry for managing wired communications, such as electrical, optical, or any other suitable communication protocols. For example, the interface device 4006 may include circuitry to support communications in accordance with Ethernet technologies. In some implementations, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some implementations, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode (LED) display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultramobile personal computer, etc.), a desktop computing device, or a server computing device or other networked computing component.

One or more computing devices implementing any of the scientific instrument support modules or methods disclosed herein may be part of a scientific instrument support system. FIG. 5 is a block diagram of an example scientific instrument support system 5000 in which some or all of the methods disclosed herein may be performed, in accordance with various implementations. The scientific instrument support modules and methods disclosed herein (e.g., the scientific instrument support module 1000 of FIG. 1 and the method 600 of FIGS. 6A and 6B) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the implementations of the computing device 4000 discussed herein with reference to FIG. 4, and any of the scientific instrument 5010, the user local computing device 5020, the service local computing device 5030, or the remote computing device 5040 may take the form of any appropriate ones of the implementations of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 4). The particular scientific instrument support system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various implementations, various ones of the communication pathways 5008 may be absent. For example, in some implementations, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as mass spectrometer 200 having a static field mass filter 204 and a mass analyser.

The user local computing device 5020 may be a computing device (e.g., in accordance with any of the implementations of the computing device 4000 discussed herein) that is local to a user of the scientific instrument 5010. In some implementations, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some implementations, the user local computing device 5020 may be a laptop, smartphone, or tablet device. In some implementations the user local computing device 5020 may be a portable computing device.

The service local computing device 5030 may be a computing device (e.g., in accordance with any of the implementations of the computing device 4000 discussed herein) that is local to an entity that services the scientific instrument 5010. For example, the service local computing device 5030 may be local to a manufacturer of the scientific instrument 5010 or to a third-party service company. In some implementations, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some implementations, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the implementations of the computing device 4000 discussed herein) that is remote from the scientific instrument 5010 and/or from the user local computing device 5020. In some implementations, the remote computing device 5040 may be included in a datacentre or other large-scale server environment. In some implementations, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some implementations, one or more of the elements of the scientific instrument support system 5000 illustrated in FIG. 5 may not be present. Further, in some implementations, multiple ones of various ones of the elements of the scientific instrument support system 5000 of FIG. 5 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an implementation, the service local computing device 5030 may monitor these multiple scientific instruments 5010, and the service local computing device 5030 may cause updates or other information to be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, etc.). In some implementations, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some implementations, a scientific instrument 5010 may be sold by the manufacturer along with one or more associated user local computing devices 5020 as part of a local scientific instrument computing unit 5012.

In some implementations, different ones of the scientific instruments 5010 included in a scientific instrument support system 5000 may be different types of scientific instruments 5010. In some such implementations, the remote computing device 5040 and/or the user local computing device 5020 may combine data from different types of scientific instruments 5010 included in a scientific instrument support system 5000.

Figure 6A:
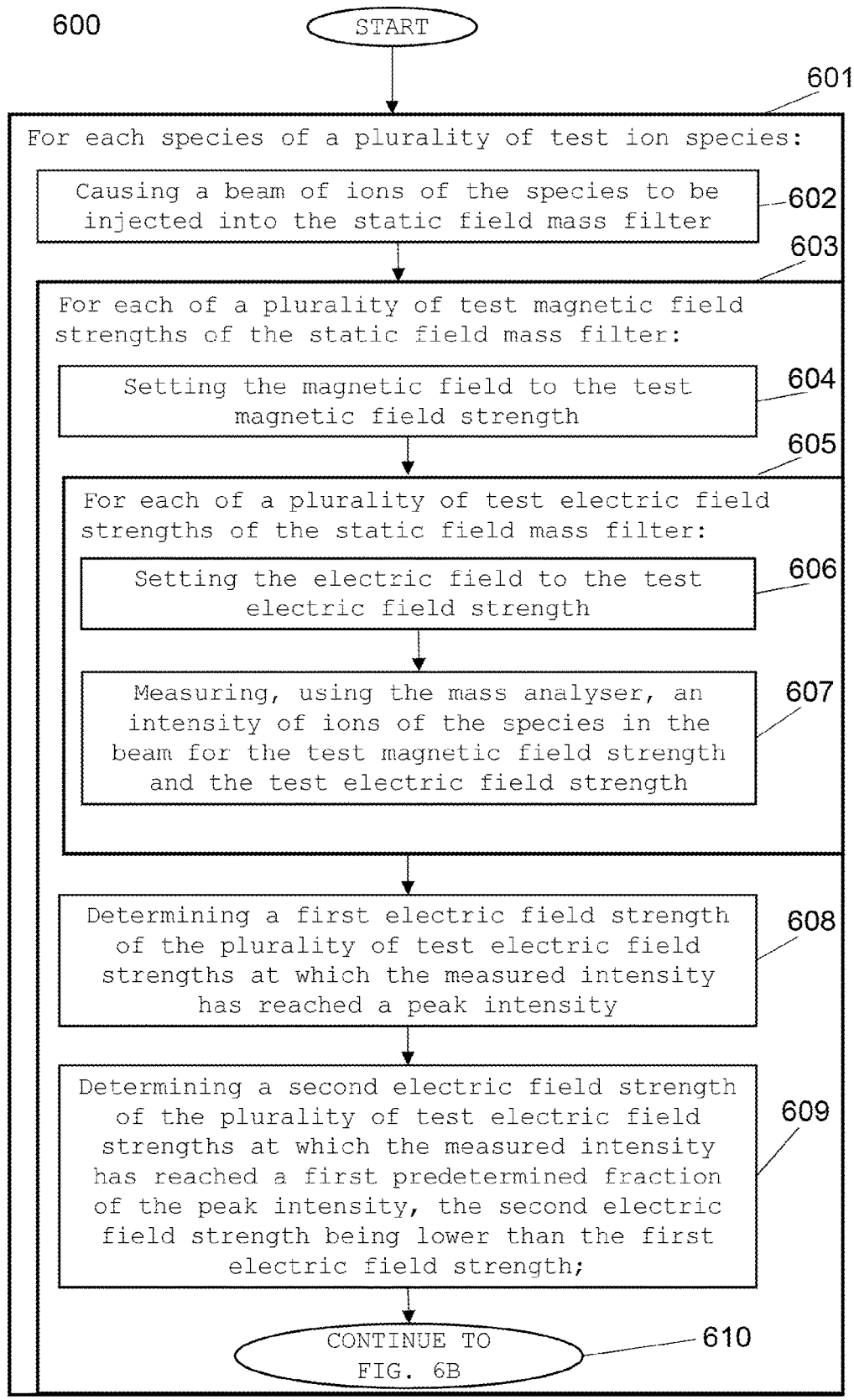
FIGS. 6A and 6B are parts of a flow diagram of an example method of determining an expected response to injecting a beam of ions of at least one species of interest into a static field mass filter of a mass spectrometer, in accordance with various implementations.
Figure 6B:
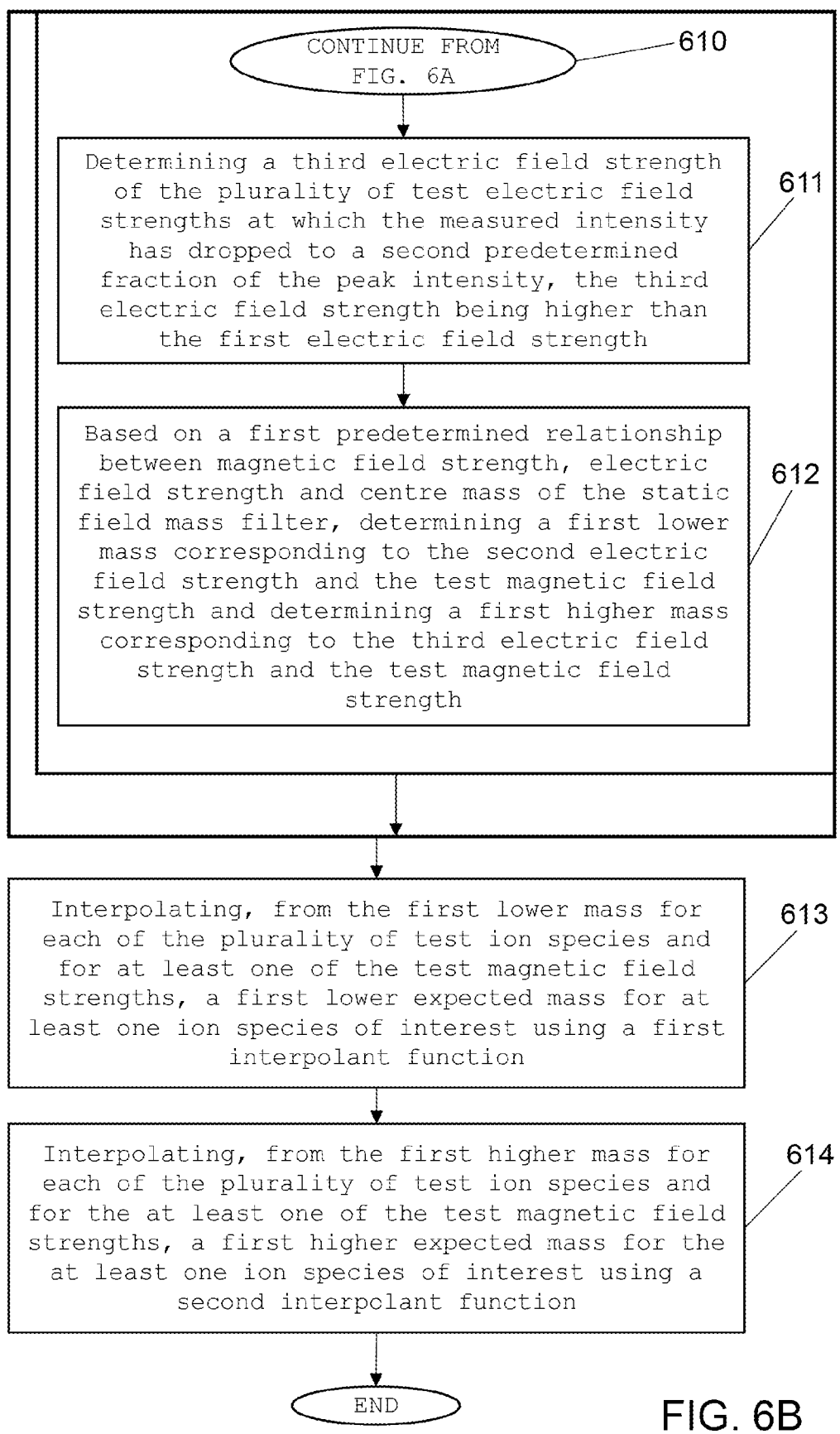
Figure 6C:
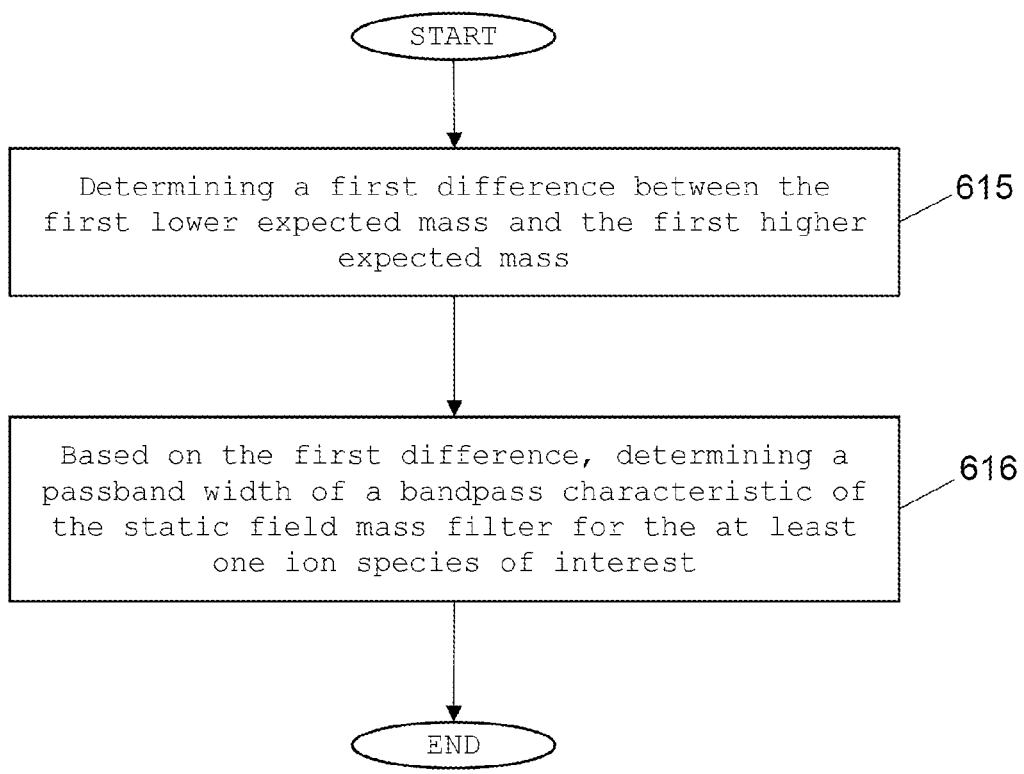
FIG. 6C is a flow diagram showing example additional steps for the method of FIGS. 6A and 6B, in accordance with various implementations.
Figure 6D:
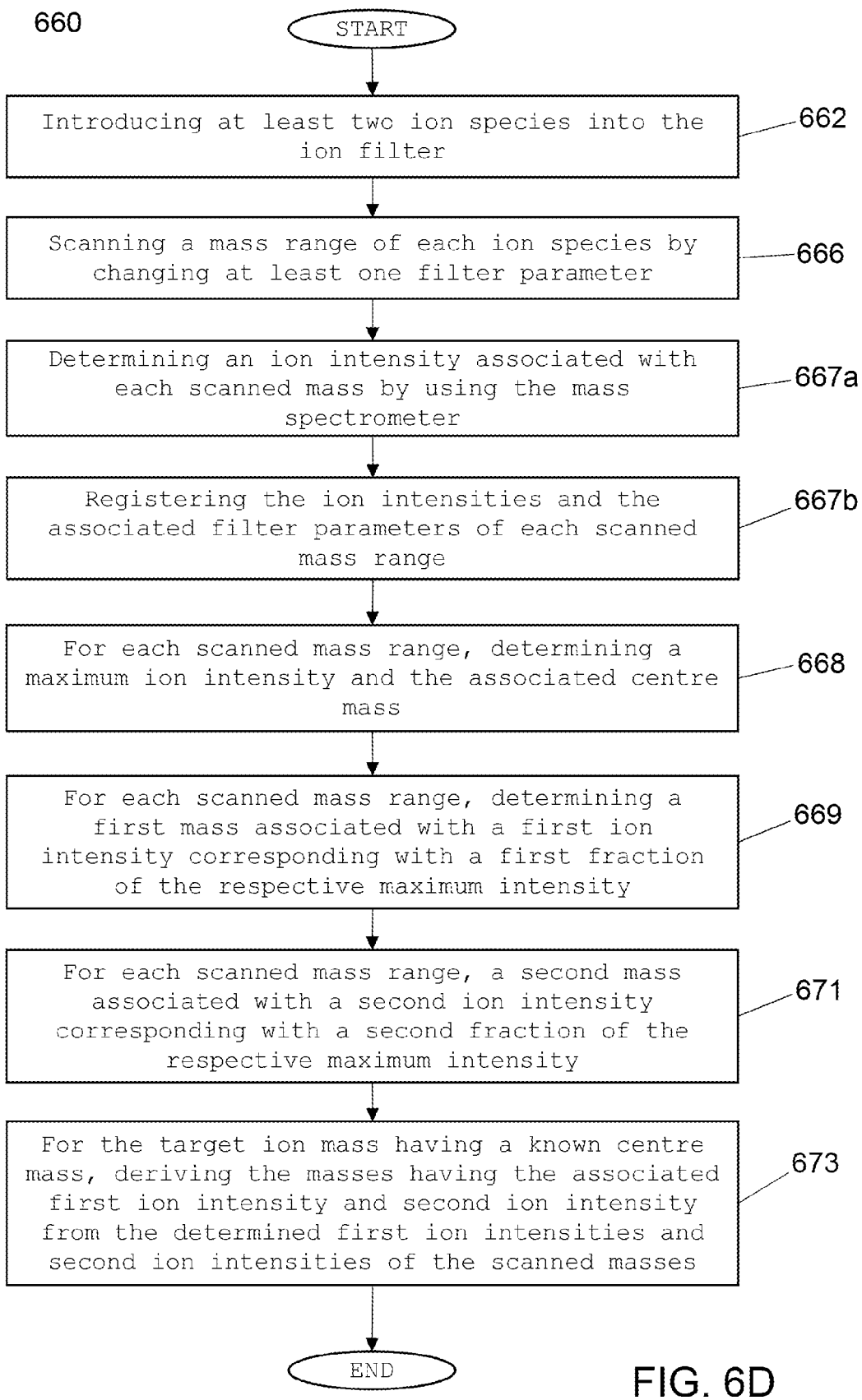
FIG. 6D is a flow diagram showing an alternative example method of determining an expected response to injecting a beam of ions of at least one species of interest into a static field mass filter of a mass spectrometer, in accordance with various implementations.

A method 600 of determining an expected response to injecting a beam of ions of at least one species of interest into a static field mass filter 204 of a mass spectrometer 200 (or, in other words, a method of determining a bandpass range of a static field mass filter 204 of a mass spectrometer 200) comprises steps 601 to 614 shown in FIGS. 6A and 6B (or, alternatively, steps 662 to 673 shown in FIG. 6D). The mass spectrometer may comprise a mass analyser. The mass spectrometer may comprise a static field mass filter 204 which may comprise a first Wien filter 212 and a second Wien filter 215. The steps shown in FIGS. 6A and 6B, and the alternative steps shown in FIG. 6D are discussed together below.

Steps 601 to 612 of method 600 may be repeated (601) for each species 701A, 701B, 701C of a plurality of test ion species 701. Each species 701A, 701B, 701C of the plurality of test ion species 701 has a mass 720. The masses of the test ion species may be evenly distributed across a mass range of interest. The test ion species may be ion species that are different from the at least one ion species of interest.

At step 602, a beam of ions of the test species 701A, 701B, 701C may be caused to be injected into the static field mass filter 204. Alternatively, at step 662 a beam of ions at least two ion species (e.g., any two of 701A, 701B, 701C) may be caused to be injected into the static field mass filter 204. The beam may, for example, be caused to be injected by sending a message to the mass spectrometer 200 to instruct the mass spectrometer 200 to inject a beam.

Steps 604 to 612 of method 600 may be repeated (603) for each magnetic field strength 702A, 702B, 702C, 702D of a plurality of test magnetic field strengths 702 of the static field mass filter 204. The plurality of test magnetic field strengths may each be expressed as respective fractions of a predetermined maximum magnetic field strength (or 'reference value').

At step 604, the magnetic field may be set to the test magnetic field strength 702A, 702B, 702C, or 702D.

Steps 606 to 607 of method 600 may be repeated (605) for each of a plurality of test electric field strengths of the static field mass filter 204. The plurality of test electric field strengths may each be expressed as respective fractions of a predetermined maximum electric field strength (or 'reference value').

At step 606, the electric field may be set to the test electric field strength.

As an alternative to steps 603 to 606, at step 666, a mass range of each of the ion species may be scanned by changing at least one parameter of the static field mass filter. Each ion species has a centre mass; a mass range of an ion species is a mass range including (or 'surrounding') the centre mass.

At step 607, using the mass analyser, an intensity of ions of the species 701A, 701B, 701C in the beam may be measured for the test magnetic field strength 702A, 702B, 702C, or 702D and the test electric field strength. Alternatively, at steps 667a and 667b, an ion intensity associated with each scanned mass (e.g., the chosen two of 701A, 701B, 701C) may be determined using the mass spectrometer, and the ion intensities and the associated filter parameters of each scanned mass range may be registered (or 'recorded').

At step 608, a first electric field strength of the plurality of test electric field strengths at which the measured intensity has reached a peak intensity may be determined. The associated peak intensity may also be determined. Alternatively, at step 668, for each scanned mass range, a maximum ion intensity and the associated centre mass may be determined.

At step 609, a second electric field strength 703 of the plurality of test electric field strengths at which the measured intensity has reached a first predetermined fraction of the peak intensity may be determined, the second electric field strength being higher than the first electric field strength. Alternatively, at step 669, a first mass associated with a first measured ion intensity of a first species, corresponding with a first fraction of a maximum measured intensity, may be determined.

Step 610 in FIG. 6A indicates that the method 600 continues in FIG. 6B.

At step 611, a third electric field strength 704 of the plurality of test electric field strengths at which the measured intensity has reached a second predetermined fraction of the peak intensity may be determined, the third electric field strength being lower than the first electric field strength. Alternatively, at step 671, a second mass associated with a second measured ion intensity of the first species, corresponding with a second fraction of the maximum measured intensity, may be determined.

The first and second predetermined fractions are smaller than 1. The first and second predetermined fractions may be the same. For example, the first and second predetermined fractions may be 0.8.

At step 612, based on a first predetermined relationship between magnetic field strength, electric field strength and centre mass of the static field mass filter 204, a first lower mass 705 corresponding to the second electric field strength 703 and the test magnetic field strength 702A, 702B, 702C, or 702D may be determined and a first higher mass 706 corresponding to the third electric field strength 704 and the test magnetic field strength 702A, 702B, 702C, or 702D may be determined. The predetermined relationship is explained in further detail below. Alternatively, in steps 669 and 671, the first mass may be lower than the centre mass of the first ion species and the second mass may be higher than the centre mass of the first ion species.

At step 613, a first lower expected mass 707 for at least one ion species 710 of interest may be interpolated using a first interpolant function, from the first lower mass 705 for each test ion species 701A, 701B, 701C of the plurality of test ion species 701 and for at least one of the test magnetic field strengths 702A, 702B, 702C, or 702D.

At step 614, a first higher expected mass 708 for the at least one ion species 710 of interest may be interpolated using a second interpolant function, from the first higher mass 706 for each 701A, 701B, 701C of the plurality of test ion species 701 and for the at least one of the test magnetic field strengths 702A, 702B, 702C, or 702D.

As an alternative to steps 613 to 614, at step 673, for a target ion mass, the masses having the associated first and second ion intensities may be derived from the determined first ion intensities and second ion intensities of the scanned masses.

One may wish to interpolate expected masses not only for an ion species 710 of interest but also, for example, for magnetic field strengths for which the method 600 has not been performed (e.g., different from test magnetic field strengths 702A, 702B, 702C, or 702D). This may be because it would be excessively time-consuming to take measurements for a large plurality of test magnetic field strengths 702 of the static field mass filter 204.

To this end, as an addition to method 600, a second lower expected mass for at least one magnetic field strength of interest may be interpolated using a third interpolant function, from the first lower mass 705 for each 702A, 702B, 702C, 702D of the plurality of test magnetic field strengths 702 and for at least one of the test ion species 701A, 701B, or 701C; and a second higher expected mass for the at least one magnetic field strength of interest may be interpolated using a fourth interpolant function, from the first higher mass 706 for each 702A, 702B, 702C, 702D of the plurality of test magnetic field strengths 702 and for the at least one of the test ion species 701A, 701B, or 701C.

Any of the first, second, third and fourth interpolant functions may be a polynomial function.

Method 600 may optionally comprise steps 615 and 616 shown in FIG. 6C. At step 615, a first difference 709 between the first lower expected mass 707 and the first higher expected mass 708 may be determined. At step 616, based on the first difference 709, a passband width 901 of a bandpass characteristic 900 of the static field mass filter 204 may be determined for the at least one ion species of interest 710.

One may wish to interpolate expected masses, in accordance with various implementations of method 600, for other predetermined fractions of the peak intensity. This may be to determine a more detailed expected response of the mass spectrometer.

To this end, as an addition to method 600, a fourth electric field strength 711 of the plurality of test electric field strengths at which the measured intensity has reached a third predetermined fraction of the peak intensity may be determined, the fourth electric field strength being higher than the first electric field strength; and a fifth electric field strength 712 of the plurality of test electric field strengths at which the measured intensity has reached a fourth predetermined fraction of the peak intensity may be determined, the fifth electric field strength being lower than the first electric field strength.

The third and fourth predetermined fractions are smaller than 1. The third and fourth predetermined fractions may be the same. For example, the third and fourth predetermined fractions may be 0.2. The third predetermined fraction may be smaller than the first predetermined fraction, and the fourth predetermined fraction may be smaller than the second predetermined fraction. For example, the first and second predetermined fractions may be 0.8, and the third and fourth predetermined fractions may be 0.2.

Additionally, based on the first predetermined relationship between magnetic field strength, electric field strength and centre mass of the static field mass filter 204, a second lower mass 713 corresponding to the fourth electric field strength 711 and the test magnetic field strength 702A, 702B, 702C, or 702D may be determined and a second higher mass 714 corresponding to the fifth electric field strength 712 and the test magnetic field strength 702A, 702B, 702C, or 702D may be determined.

Additionally, a third lower expected mass 715 for at least one ion species 710 of interest may be interpolated using a fifth interpolant function, from the second lower mass 713 for each 701A, 701B, 701C of the plurality of test ion species 701 and for at least one of the test magnetic field strengths 702A, 702B, 702C, or 702D; and a third higher expected mass 716 for the at least one ion species 710 of interest may be interpolated using a sixth interpolant function, from the second higher mass 714 for each 701A, 701B, 701C of the plurality of test ion species 701 and for the at least one of the test magnetic field strengths 702A, 702B, 702C, or 702D.

With additional interpolated expected masses 715, 716, in accordance with various implementations of method 600, for other predetermined fractions of the peak intensity, a lower 902 and/or upper 903 flank width of the bandpass characteristic 900 of the static field mass filter 204 may be determined.

For example, a second difference 717 between the first lower expected mass 707 and the third lower expected mass 715 may be determined. Based on the second difference 717, a lower flank width 902 of the bandpass characteristic 900 of the static field mass filter 204 may be determined for the at least one ion species 710 of interest.

As another example, a third difference 718 between the first higher expected mass 708 and the third higher expected mass 716 may be determined. Based on the third difference 718, an upper flank width 903 of the bandpass characteristic 900 of the static field mass filter 204 may be determined for the at least one ion species 710 of interest.

In some implementations described herein, method 600 may comprise displaying one or more of the interpolated lower 707, 715 and higher 708, 716 expected masses. Method 600 may also comprise displaying one or more of the determined lower 705, 713 and higher 706, 714 masses. Method 600 may, additionally or alternatively, comprise displaying the transmission windows of the interpolated lower and higher expected masses.

Referring to FIG. 2B, the mass spectrometer comprises a static field mass filter 204 which comprises a first Wien filter 212 and a second Wien filter 215. A Wien filter combines magnetic and electric fields. While the electric field of the first Wien filter 212 deflects all ions irrespective of their mass 720, the deflection caused by the magnetic field is higher for light ions 701C than for heavy ions 701A. Applying a magnetic field therefore leads to a mass dispersion. Since ions of all masses are deflected (only with a different deflection magnitude), no ion stays in the ion optical centre and therefore no ion is transmitted through the Wien filters 212, 215. However, by applying an electric field with the opposite direction in the second Wien filter 215 at the same time, the effect of the magnetic field can be cancelled out for one specific mass (e.g., 710), while all other masses are deflected. Ions with a mass similar to the centre mass stay close to the centre axis of the ion optics and are transmitted well trough the Wien filters 212, 215. Ions with a significantly different masses have a lower transmission. And ions with even greater mass differences are not transmitted at all.

Figure 9:
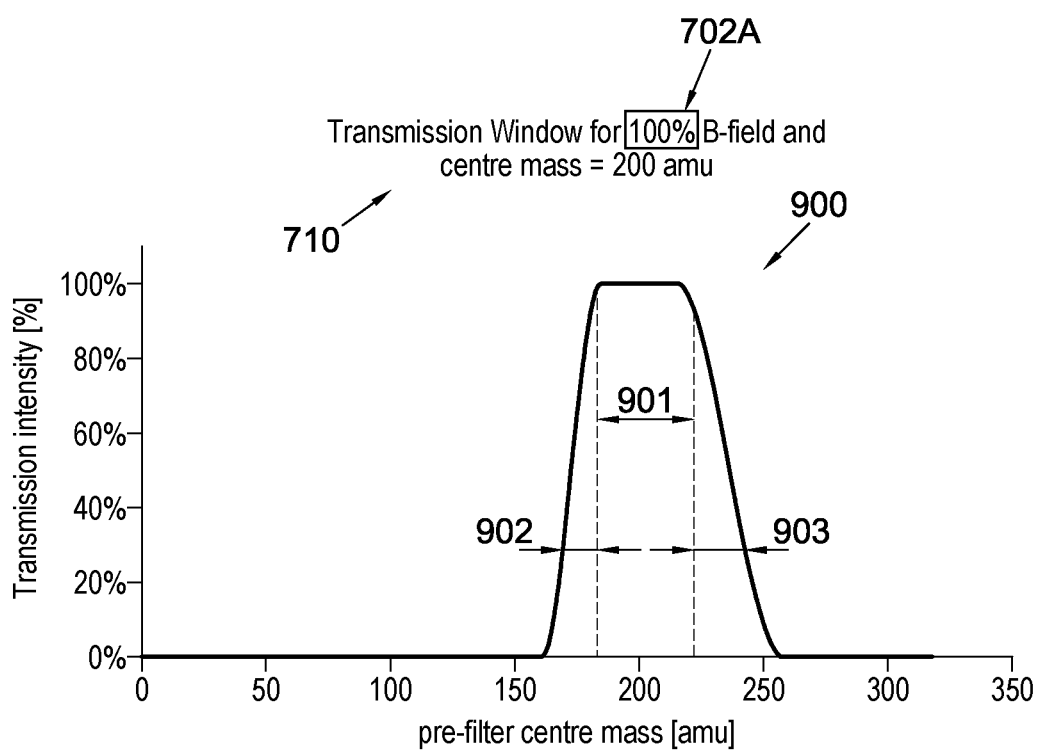
FIG. 9 is an example of a bandpass characteristic of a static field mass filter obtained for the at least one ion species of interest by performing the method of FIGS. 6A and 6B, in accordance with various implementations.

Referring to FIG. 9, herein, the mass ranges may be referred to as:

Transmission mass range (or passband 901 of the bandpass characteristic 900), i.e., the range for ions with masses that are substantially fully transmitted;

Low mass flank (or lower flank 902 of the bandpass characteristic 900), i.e., the range for ions with transmission between 0% and 100% of the full transmission and which are lighter than the centre mass 710;

High mass flank (or upper flank 903 of the bandpass characteristic 900), i.e., the range for ions with transmission between 0% and 100% of the full transmission and which are heavier than the centre mass 710.

The entire transmission of the static field mass filter may be called bandpass (or bandpass characteristic 900 of the static field mass filter 204).

In the example of FIG. 2B, the parameters to adjust the behaviour of the Wien filters 212, 215 are the magnetic field (B-field) and the electric field (E-field). To predict the transmission of the double Wien filter 212 and 215, a calibration is useful showing which masses have which transmission at given transmission window conditions (B-field 702A, 702B, 702C, 702D/E-field 703, 704, 712, 713 combinations).

A solution for the problem is to adjust the pre-filter and measure the transmission efficiency of a row of elements that are distributed (preferably approximately evenly) across the mass range of interest, repeating the measurements for various pre-filter settings. For example, the pre-filter transmission curve is measured for five settings (centre masses 12, 88, 142, 178, 238). The result may be a mass spectrum with analyte masses of equal or known intensity to characterize bandpass shape, before activation of the pre-filter. Analyte masses after sequentially tuning the pre-filter with centre masses to 12, 88, 142, 178, and 238 amu may then be obtained. This solution is very complex since it requires a sample solution that contains basically an isotope on every mass, because different combinations of window width and centre masses would cover more or less the whole periodic table, and is therefore very time consuming.

The approach described solves the problem by providing a simple way to measure the raw data for a calibration curve and how it can be converted into the calibration curves.

A benefit of the present approach is that it can extrapolate the transmission curve 900 for all pre-filter settings from a limited number of measurements. Besides a reduced number of measurements compared with the intuitive solution, the approach of the present disclosure has the benefit that no special sample solution is required. All necessary measurements can be done with a standard tuning solution (i.e., with fewer elements/ion species).

An example workflow may be as follows.

The data may be measured as follows:

1) Set a low B-field 702D (20% for example);
2) Set the centre mass of the Neoma™ to the lightest element that shall be measured 701C (Nd for example);
3) Sweep the electric field of the pre-filter such that the intensity increases from 0 to 100% and drops again to zero (note the E-field values 711, 712 for 20% transmission on both sides and for 80% transmission 703, 704 on both sides as well as the average E-field of the four values);
4) Repeat for other elements 701A, 701B (for example 178Hf or 238U)
5) Repeat steps 1 to 4 for 50%, 80% and 100% B-field 702C, 702B, 702A.

Figure 7A:
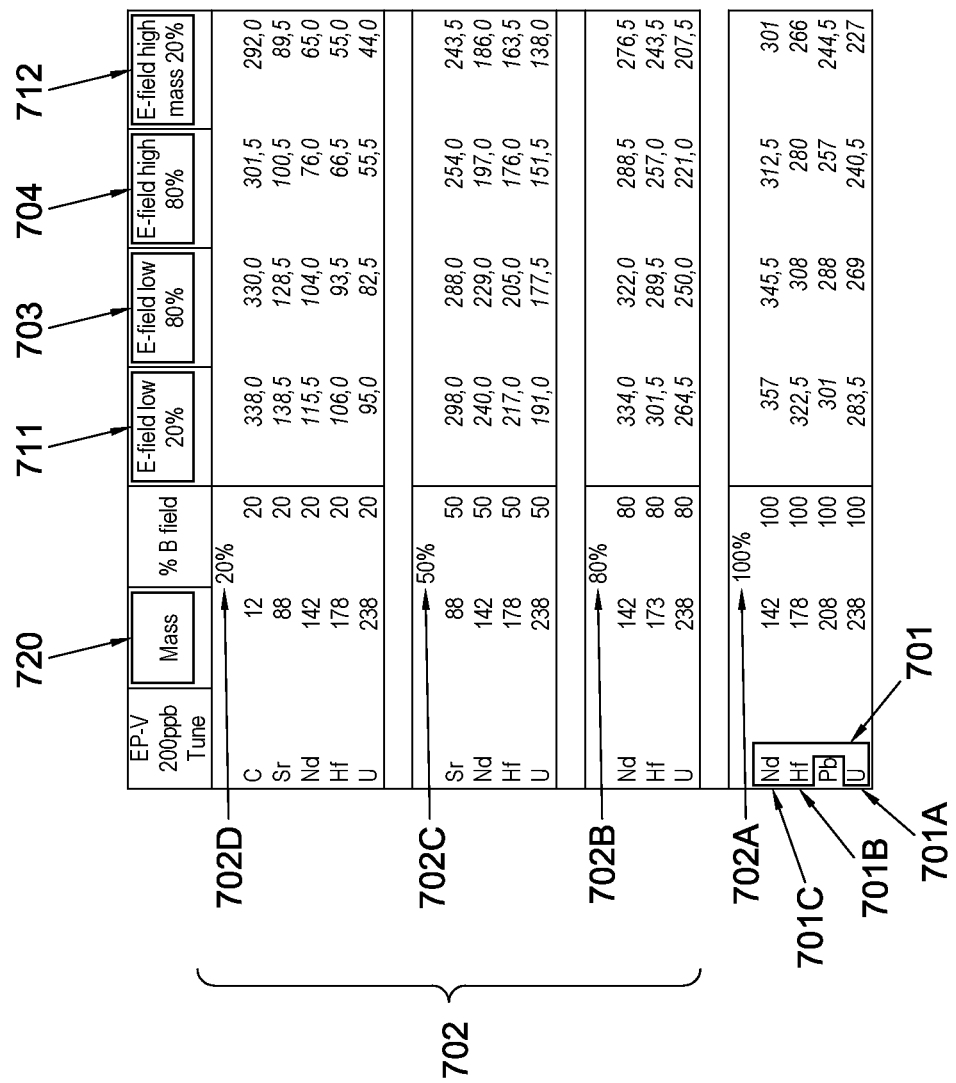
FIG. 7A is a table showing an example of data obtained by performing the method of FIGS. 6A and 6B, in accordance with various implementations.

FIG. 7A shows an example of measured data according to the present approach. Columns D to G contain the E-field values for 20% 711, 712 and 80% 703, 704 transmission of the various centre mass/window width combinations.

A mass calibration curve may be determined as follows.

Referring again to FIG. 7A, column I contains the average E-fields. Column J shows the E-fields based on the ion optical theory of the double Wien filter: $U_{Wien}=\text{const}\cdot\sqrt{(E/m)}\cdot d\cdot B$.

where:
$U_{wien}$: Wien filter voltage producing field E [V],
const: a constant relating to the construction and dimensions of the static field mass filter 204, which may have a value in a range from 20 to 60, more specifically in a range from 30 to 50;
E, kinetic energy [eV];
m, centre mass [amu];
d, magnetic gap between pole pieces of first and second Wien filters [m];
B, magnetic field [T] (which can also be expressed as a percentage of a reference value).

This equation is one option for the first predetermined relationship.

To account for the differences between the theoretical values (in column J) and the average measured values (in column I) a correction factor is introduced (in column K).

The correction factor may be obtained by fitting a polynomial function of the magnetic field B to account for the above-mentioned difference. The correction factor should remain the same for a given mass spectrometer and for a given value of the magnetic field B in various operational regimes.

After fitting the correction factor to the magnetic field, the mass calibration function is as follows:

$$U_{Wien}=\text{const}\cdot\sqrt{(E/m)}\cdot d\cdot B\cdot(C_1\cdot B^2+C_2\cdot B+C_3)$$

where $C_1$, $C_2$, $C_3$ are the polynomial fit coefficients for the correction factor.

This equation is another option for the first predetermined relationship.

With this equation the corresponding E-field for a given centre mass and B-field can be calculated. After rearranging, the equation gives the corresponding centre mass 705, 706, 713, 714 for a given E-field 703, 704, 711, 712/B-field 702A, 702B, 702C, 702D combination.

The calculation of 80% (first predetermined fraction) and 20% (second predetermined fraction) transmission curves for the low 902 mass and high mass flank 903 for a given B-field strength 702 may be performed as follows.

Referring to FIG. 7B, after calculating the mass calibration the collected E-field values 703, 704, 711, 712 (in columns D to G) can be translated into masses 705, 706, 713, 714 (in columns J to K).

Figure 7C:
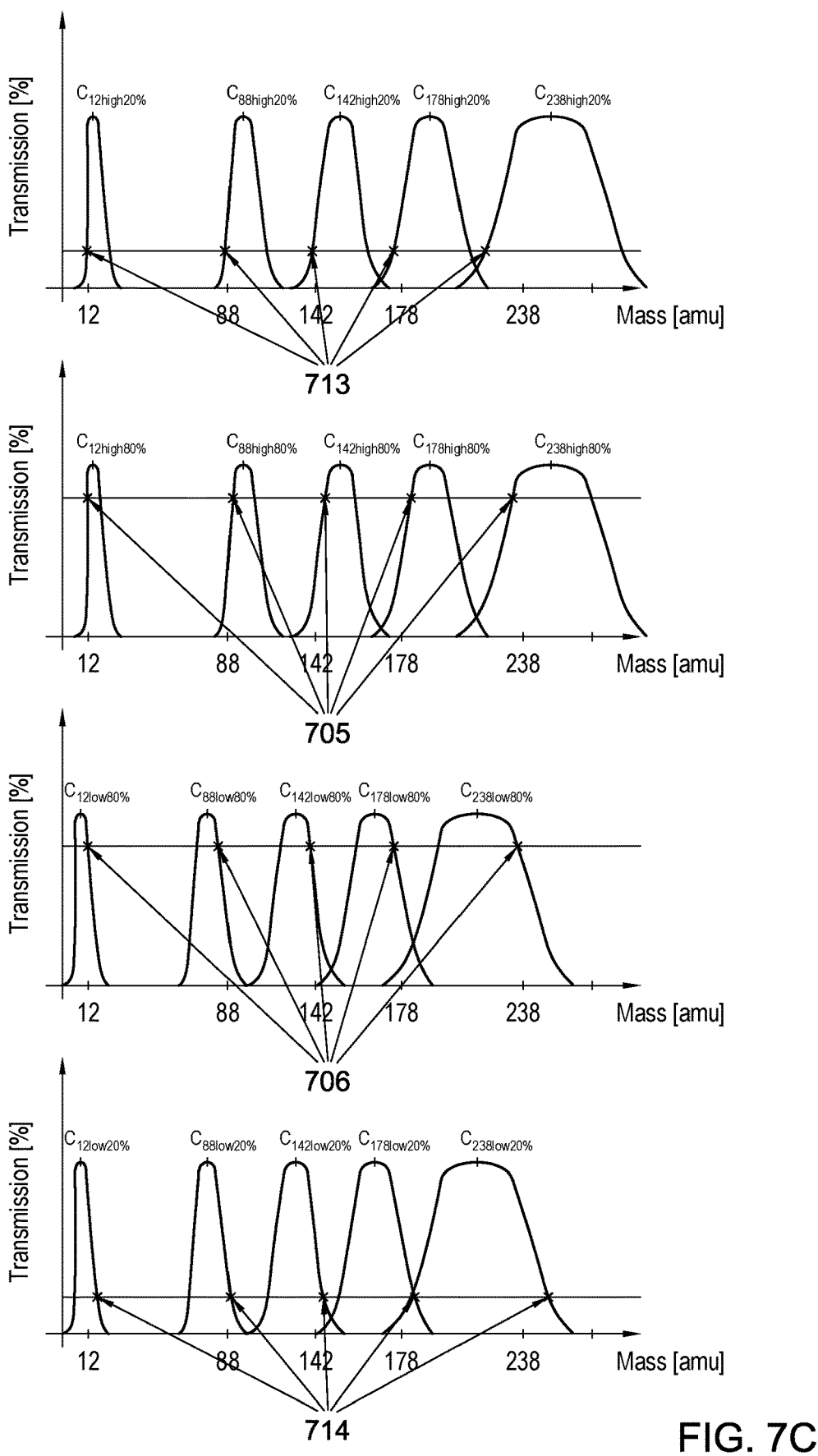
FIG. 7C is an example plot of select data from the table of FIG. 8B.

As an example, FIG. 7C indicates, with crosses on the curves, the measurement positions (12, 88, 142, 178, 238 amu of B35 to B38 in FIG. 7B) relative to the centre mass of the entire bandpass curve of the pre-filter for 20% high mass side 714, 80% high mass side 706, 80% low mass side 705 and 20% low mass side 713 (J35 to J38, K35 to K38, L35 to K38, M35 to M38) with 100% B-field 702A.

For example, cell K25 in FIG. 7B means that the Nd signal is reduced to 80% of its maximum intensity when the prefilter is set to a centre mass of 167.7 amu at 50% magnetic field strength. In comparison, a centre mass of 196.7 amu is needed to reduce the Nd Signal to 80% of its maximum intensity if a magnetic field strength of 20% is set (see cell K18).

Figure 8A:
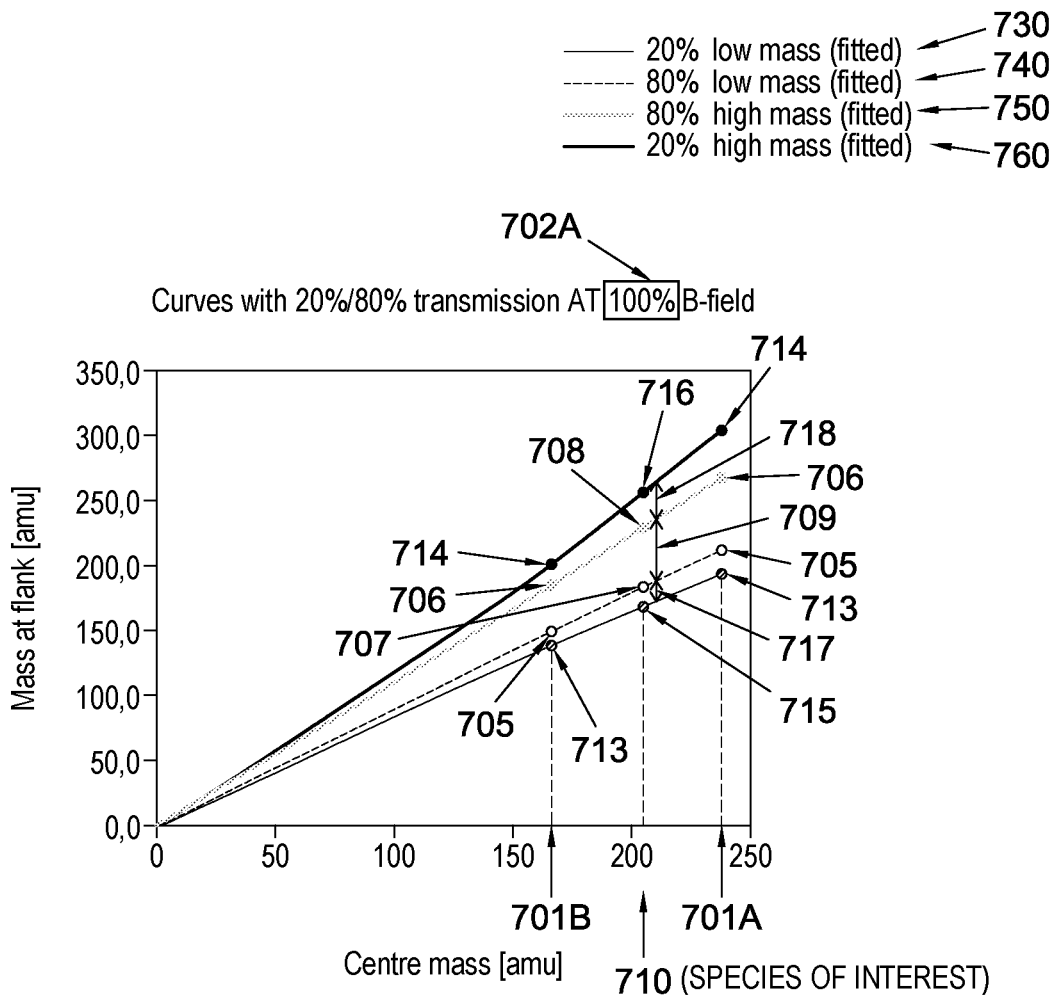
FIG. 8A is an example of displaying interpolated lower and higher expected masses and determined lower and higher masses of the method of FIGS. 6A and 6B, in accordance with various implementations.

For example, interpolating between the masses with 20% transmission on the low mass side 713 (plotted on the Y-Axis) for the corresponding centre masses (plotted on the X-Axis), e.g., 710, leads to curve 730 in FIG. 8A, which shows the curves with 20% transmission low mass side 713 (curve 730), 80% transmission low mass side 705 (curve 740), 80% transmission high mass side 706 (curve 750) and 20% transmission high mass side 714 (curve 760).

The equation for the curves 730, 740, 750, 760 has the form:

$$m_{X\%\ Transm\ low/high\ mass} = m_{center}^2 \cdot C_1 + m_{center} \cdot C_2 + C_3$$

With $C_1$, $C_2$, $C_3$ being individual coefficients for a curve 730, 740, 750, or 760 and X denoting the transmission fraction (e.g., 20%).

From these curves the visualization of the transmission window can directly be derived:
- the difference 717 between curve 740 and curve 730 is the approximate width 902 of the lower flank or a basis for calculating the approximate width 902 of the lower flank;
- the difference 709 between curve 750 and curve 740 is the approximate width 901 of the centre area with 100% transmission, also referred to as the passband width 901;
- the difference 718 between curve 760 and curve 760 is the approximate width 903 of the upper flank.

With these calculated values the transmission window can be visualized as shown in FIG. 9, which shows a visualization of the pre-filter mass transmission 900 with 200 amu centre mass 710 and 100% B-field 702A.

Figure 8B:
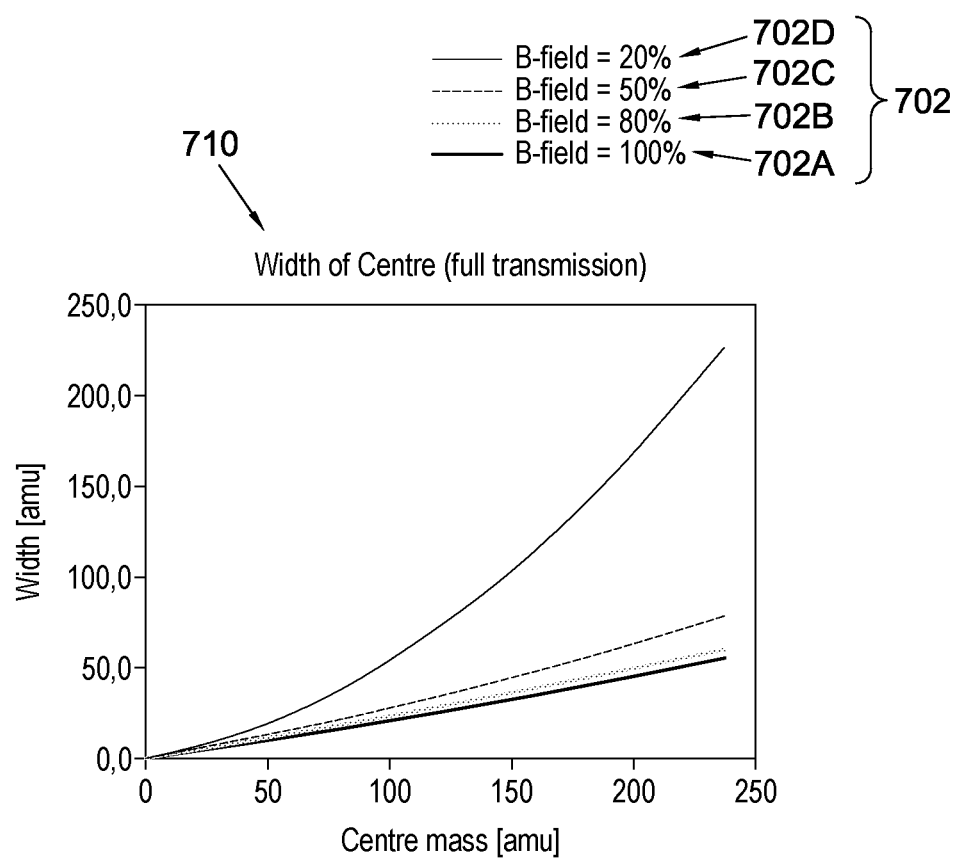
FIG. 8B is another example of displaying interpolated lower and higher expected masses and determined lower and higher masses of the method of FIGS. 6A and 6B, in accordance with various implementations.

An interpolation to all B-field values may be performed. The workflow described above explains how to calculate the transmission curve for a given B-field strength 702. To be able to visualize the window also for all other magnetic field strengths, the curves showed in FIG. 8A (100% magnetic field strength 702A) are also obtained for 20%, 50% and 80% magnetic field strength 702D, 702C, 702B. FIG. 8B shows how the width 901 of the centre changes for different B-fields 702. Each curve is a polynomial fit function of the measurements showed in FIG. 7B with the coefficients $C_1$, $C_2$, $C_3$. By fitting each of the coefficients to the B-field, the coefficients become a function of the B-field:

$$U_{Wien} = m_{center}^2 \cdot f_{C1}(B) + m_{center} \cdot f_{C2}(B) + f_{C3}(B)$$

An advantage of this workflow is that tuning is not trial and error and the trade-off between a narrow 901 transmission window 900 with steep flanks 902, 903 and a wide 901 window 900 with flat flanks 902, 903 can be visualised.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described implementation. Various additional operations may be performed, and/or described operations may be omitted in additional implementations. Operations are illustrated once each and in a particular order in FIGS. 6A, 6B, 6C, and 6D, but the operations may be reordered and/or repeated as desired and appropriate (e.g., different operations performed may be performed in parallel, as suitable).

The approaches described herein may be embodied on a computer-readable medium, which may be a non-transitory computer-readable medium. The computer-readable medium carries computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge. The computer-readable medium may be transitory (e.g., a wire or a wireless propagation medium in which a signal is being transmitted) or non-transitory.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an implementation", "various implementations", and "some implementations", each of which may refer to one or more of the same or different implementations. Furthermore, the terms "comprising", "including", "having", and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

Those skilled in the art will recognise that the scope of the invention is not limited by the examples described herein, but is instead defined by the appended claims.

The invention claimed is:

1. A non-transitory computer-readable medium comprising instructions which, when executed by a processor of an apparatus, cause the apparatus to perform a method of determining, for a target ion mass, a bandpass range of an ion filter for a mass spectrometer, the method comprising:
   introducing at least two ion species into the ion filter;
   scanning a mass range of each ion species by changing at least one filter parameter;
   determining an ion intensity associated with each scanned mass using the mass spectrometer;
   registering the ion intensities and the associated filter parameters of each scanned mass range;
   for each scanned mass range, determining a maximum ion intensity and the associated centre mass;

for each scanned mass range, determining:
  a first mass associated with a first ion intensity corresponding with a first fraction of the respective maximum intensity, and
  a second mass associated with a second ion intensity corresponding with a second fraction of the respective maximum intensity,
  wherein the first mass is lower than the centre mass of the ion species and the second mass is higher than the centre mass of the ion species; and
for the target ion mass having a known centre mass, deriving the masses having the associated first ion intensity and second ion intensity from the determined first ion intensities and second ion intensities of the scanned masses, wherein the deriving comprises:
  interpolating, from the first mass, a first expected mass having the associated first ion intensity using a first interpolant function; and
  interpolating, from the second mass, a second expected mass having the associated second ion intensity using a second interpolant function.

2. The non-transitory computer-readable medium of claim 1, wherein the method further comprises:
determining a first difference between the first expected mass and the second expected mass; and
based on the first difference, determining a passband width of a bandpass characteristic of the ion filter for the target ion species.

3. The non-transitory computer-readable medium of claim 1, wherein the method further comprises:
for each scanned mass range, determining:
  a third mass associated with a third ion intensity corresponding with a third fraction of the respective maximum intensity, and
  a fourth mass associated with a fourth ion intensity corresponding with a fourth fraction of the respective maximum intensity,
  wherein the third mass is lower than the centre mass of the ion species and the fourth mass is higher than the centre mass of the ion species; and
for the target ion mass having a known centre mass, deriving the masses having the associated third ion intensity and fourth ion intensity from the determined third ion intensities and fourth ion intensities of the scanned masses.

4. The non-transitory computer-readable medium of claim 3, wherein the deriving comprises:
interpolating, from the third mass, a third expected mass having the associated third ion intensity using a third interpolant function; and
interpolating, from the fourth mass, a fourth expected mass having the associated fourth ion intensity using a fourth interpolant function,
optionally wherein the method further comprises:
determining a second difference between the first expected mass and the third expected mass; and
based on the second difference, determining a lower flank width of the bandpass characteristic of the ion filter for the target ion species.

5. The non-transitory computer-readable medium of claim 4, wherein the method further comprises:
determining a third difference between the second expected mass and the fourth expected mass; and
based on the third difference, determining an upper flank width of the bandpass characteristic of the ion filter for the target ion species.

6. The non-transitory computer-readable medium of claim 1, wherein the masses of the at least two ion species are evenly distributed over a mass range of interest.

7. The non-transitory computer-readable medium of claim 1, wherein the method further comprises:
displaying one or more of the interpolated masses and, optionally, one or more of the determined masses; and
optionally, displaying the transmission windows of the interpolated expected masses.

8. A non-transitory computer-readable medium comprising instructions which, when executed by a processor of an apparatus, cause the apparatus to perform a method of determining an expected response to injecting a beam of ions of a species of interest into a static field mass filter of a mass spectrometer comprising a mass analyser, the method comprising:
for each species of a plurality of test ion species:
  causing a beam of ions of the species to be injected into the static field mass filter; and
  for each of a plurality of test magnetic field strengths of the static field mass filter;
    setting the magnetic field to the test magnetic field strength;
    for each of a plurality of test electric field strengths of the static field mass filter:
      setting the electric field to the test electric field strength; and
      measuring, using the mass analyser, an intensity of ions of the species in the beam for the test magnetic field strength and the test electric field strength;
    determining a first electric field strength of the plurality of test electric field strengths at which the measured intensity has reached a peak intensity;
    determining a second electric field strength of the plurality of test electric field strengths at which the measured intensity has reached a first predetermined fraction of the peak intensity, the second electric field strength being higher than the first electric field strength;
    determining a third electric field strength of the plurality of test electric field strengths at which the measured intensity has reached a second predetermined fraction of the peak intensity, the third electric field strength being lower than the first electric field strength; and
    based on a first predetermined relationship between magnetic field strength, electric field strength and centre mass of the static field mass filter, determining a first lower mass corresponding to the second electric field strength and the test magnetic field strength and determining a first higher mass corresponding to the third electric field strength and the test magnetic field strength;
  interpolating, from the first lower mass for each of the plurality of test ion species and for at least one of the test magnetic field strengths, a first lower expected mass for an ion species of interest using a first interpolant function; and
  interpolating, from the first higher mass for each of the plurality of test ion species and for the at least one of the test magnetic field strengths, a first higher expected mass for the ion species of interest using a second interpolant function.

9. The non-transitory computer-readable medium of claim 8, wherein at least one of the first and second interpolant functions is a polynomial function.

10. The non-transitory computer-readable medium of claim 8, wherein the method further comprises:
   interpolating, from the first lower mass for each of the plurality of test magnetic field strengths and for at least one of the test ion species, a second lower expected mass for at least one magnetic field strength of interest using a third interpolant function; and
   interpolating, from the first higher mass for each of the plurality of test magnetic field strengths and for the at least one of the test ion species, a second higher expected mass for the at least one magnetic field strength of interest using a fourth interpolant function,
   optionally wherein at least one of the third and fourth interpolant functions is a polynomial function.

11. The non-transitory computer-readable medium of claim 8, wherein the method further comprises:
   determining a first difference between the first lower expected mass and the first higher expected mass; and
   based on the first difference, determining a passband width of a bandpass characteristic of the static field mass filter for the ion species of interest.

12. The non-transitory computer-readable medium of claim 8, wherein the method further comprises, for each species of the plurality of test ion species and for each of the plurality of test magnetic field strengths:
   determining a fourth electric field strength of the plurality of test electric field strengths at which the measured intensity has reached a third predetermined fraction of the peak intensity, the fourth electric field strength being higher than the first electric field strength; and
   determining a fifth electric field strength of the plurality of test electric field strengths at which the measured intensity has reached a fourth predetermined fraction of the peak intensity, the fifth electric field strength being lower than the first electric field strength.

13. The non-transitory computer-readable medium of claim 12, wherein the method further comprises, for each species of the plurality of test ion species and for each of the plurality of test magnetic field strengths:
   based on the first predetermined relationship between magnetic field strength, electric field strength and centre mass of the static field mass filter, determining a second lower mass corresponding to the fourth electric field strength and the test magnetic field strength and determining a second higher mass corresponding to the fifth electric field strength and the test magnetic field strength.

14. The non-transitory computer-readable medium of claim 13, wherein the method further comprises:
   interpolating, from the second lower mass for each of the plurality of test ion species and for at least one of the test magnetic field strengths, a third lower expected mass for the ion species of interest using a fifth interpolant function; and
   interpolating, from the second higher mass for each of the plurality of test ion species and for the at least one of the test magnetic field strengths, a third higher expected mass for the ion species of interest using a sixth interpolant function.

15. The non-transitory computer-readable medium of claim 14, wherein the method further comprises:
   determining a second difference between the first lower expected mass and the third lower expected mass; and
   based on the second difference, determining a lower flank width of the bandpass characteristic of the static field mass filter for the ion species of interest.

16. The non-transitory computer-readable medium of claim 14, wherein the method further comprises:
   determining a third difference between the first higher expected mass and the third higher expected mass; and
   based on the third difference, determining an upper flank width of the bandpass characteristic of the static field mass filter for the ion species of interest.

17. The non-transitory computer-readable medium of claim 8, wherein the static field mass filter comprises a first Wien filter and a second Wien filter.

18. The non-transitory computer-readable medium of claim 8, wherein each species of the plurality of test ion species has a mass and wherein the masses of the plurality of test ion species are evenly distributed over a mass range of interest.

19. The non-transitory computer-readable medium of claim 8, wherein the method further comprises:
   displaying one or more of the interpolated lower and higher expected masses and, optionally, one or more of the determined lower and higher masses; and
   optionally, displaying the transmission windows of the interpolated lower and higher expected masses.

20. A non-transitory computer-readable medium comprising instructions which, when executed by a processor of an apparatus, cause the apparatus to perform a method of determining, for a target ion mass, a bandpass range of an ion filter for a mass spectrometer, the method comprising:
   introducing at least two ion species into the ion filter;
   scanning a mass range of each ion species by changing at least one filter parameter;
   determining an ion intensity associated with each scanned mass using the mass spectrometer;
   registering the ion intensities and the associated filter parameters of each scanned mass range;
   for each scanned mass range, determining a maximum ion intensity and the associated centre mass;
   for each scanned mass range, determining:
      a first mass associated with a first ion intensity corresponding with a first fraction of the respective maximum intensity, and
      a second mass associated with a second ion intensity corresponding with a second fraction of the respective maximum intensity,
   wherein the first mass is lower than the centre mass of the ion species and the second mass is higher than the centre mass of the ion species; and
   for the target ion mass having a known centre mass, deriving the masses having the associated first ion intensity and second ion intensity from the determined first ion intensities and second ion intensities of the scanned masses.

* * * * *